United States Patent
Yamamoto

(10) Patent No.: US 7,881,545 B2
(45) Date of Patent: Feb. 1, 2011

(54) IMAGE DATA COMPRESSION METHOD AND IMAGE DATA COMPRESSION DEVICE

(75) Inventor: Toshitsugu Yamamoto, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 971 days.

(21) Appl. No.: 11/784,109

(22) Filed: Apr. 5, 2007

(65) Prior Publication Data

US 2007/0237406 A1 Oct. 11, 2007

(30) Foreign Application Priority Data

Apr. 7, 2006 (JP) ............................. 2006-106864
Feb. 13, 2007 (JP) ............................. 2007-031892

(51) Int. Cl.
G06K 9/36 (2006.01)
G06K 9/46 (2006.01)
G06K 15/00 (2006.01)
H04N 1/405 (2006.01)

(52) U.S. Cl. ...................................... 382/232; 358/3.13
(58) Field of Classification Search ......... 382/232–253; 358/3.01–3.13, 521, 539
See application file for complete search history.

(56) References Cited

U.S. PATENT DOCUMENTS

| | | | | |
|---|---|---|---|---|
| 4,884,147 A * | 11/1989 | Arimoto et al. | ............. | 358/443 |
| 5,625,712 A * | 4/1997 | Schoenzeit et al. | ........... | 382/232 |
| 5,790,131 A * | 8/1998 | Liang et al. | ................... | 345/660 |
| 5,911,006 A * | 6/1999 | Funamoto et al. | ............ | 382/232 |
| 6,137,589 A * | 10/2000 | Obrador et al. | ............. | 358/1.16 |
| 6,201,614 B1 * | 3/2001 | Lin | ............................ | 358/3.13 |
| 6,349,151 B1 * | 2/2002 | Jones et al. | .................. | 382/251 |
| 6,553,143 B2 * | 4/2003 | Miyake et al. | .............. | 382/239 |
| 6,646,759 B1 * | 11/2003 | Koga | .......................... | 358/1.9 |
| 6,731,800 B1 * | 5/2004 | Barthel et al. | ............... | 382/176 |
| 6,836,346 B2 * | 12/2004 | Yoshizawa et al. | ........... | 358/1.9 |
| 6,912,067 B2 * | 6/2005 | Lapstun et al. | ............... | 358/1.9 |
| 2001/0028468 A1 * | 10/2001 | Yamamoto | .................. | 358/1.9 |
| 2002/0031276 A1 * | 3/2002 | Yagishita et al. | ............ | 382/252 |
| 2004/0051903 A1 * | 3/2004 | Lapstun et al. | ............... | 358/2.1 |
| 2005/0083550 A1 * | 4/2005 | Silverbrook et al. | ........ | 358/1.15 |
| 2005/0123206 A1 * | 6/2005 | Sakai et al. | .................. | 382/238 |
| 2006/0066909 A1 * | 3/2006 | Yamamoto | .................. | 358/3.13 |

FOREIGN PATENT DOCUMENTS

| | | |
|---|---|---|
| JP | 2001-238085 | 8/2001 |
| JP | 2003-69835 | 3/2003 |
| JP | 2005-252573 | 9/2005 |

* cited by examiner

Primary Examiner—Samir A. Ahmed
Assistant Examiner—Li Liu
(74) Attorney, Agent, or Firm—Sidley Austin LLP

(57) ABSTRACT

An image data compression method includes the steps of dividing image data into predetermined regions, generating modeled data by extracting a feature of the image data for each of the regions, performing trial calculation of data quantity of compressed data that is generated by a thinning-out process in which data is thinned out from the modeled data based on a threshold value concerning the thinning-out process, determining a thinning-out threshold value that is a threshold value such that the data quantity becomes equal to or less than a predetermined target data quantity, and performing the thinning-out process based on the thinning-out threshold value so that compressed data is generated.

12 Claims, 30 Drawing Sheets

FIG. 8

| DIVIDED REGION | TL1 | TL2 | TL3 | TL4 | | | TL5 | TL6 | TL7 | | | TL8 | ... |
|---|---|---|---|---|---|---|---|---|---|---|---|---|---|
| THE NUMBER OF BITS | 7 | 7 | 7 | 7 | 7 | 64 | 6 | 7 | 7 | 7 | 64 | 6 | 7 | ... |
| MODELED DATA | 28 | 28 | 30 | F | 28 | D | 3 | 40 | 42 | F | 41 | D | 2 | 39 | ... |

TLx — TL1, TL2, TL3
TLy — TL4
TLx — TL5, TL6
TLy — TL7

| REPRESENTATIVE VALUE DIFFERENCE | CODE | THE NUMBER OF ADDITIONAL BITS |
|---|---|---|
| 0 | 00 | 0 |
| −1,1 | 010 | 1 |
| −3,−2,2,3 | 011 | 2 |
| −7,−6,−5,−4,4,5,6,7, | 100 | 3 |
| −15,⋯−8,8,⋯15 | 101 | 4 |
| −32,⋯−16,16,⋯32 | 110 | 6 |
| SWITCH FLAG | 111 | 0 |

| THE NUMBER OF UNMATCHING DOTS | THE NUMBER OF REGIONS |
|---|---|
| 0 | 21781 |
| 1 | 9720 |
| 2 | 4413 |
| ⋮ | ⋮ |

FIG. 20

DCT COEFFICIENT

| 224 | 130 | 40 | 16 | 11 | 8 | -2 | -1 |
|---|---|---|---|---|---|---|---|
| 41 | -34 | -14 | -10 | -4 | 0 | -1 | 3 |
| -7 | 10 | -12 | 2 | 2 | -5 | 1 | -1 |
| 22 | -7 | 9 | 2 | 0 | 0 | -3 | 2 |
| -8 | 4 | -6 | 3 | -1 | -2 | 4 | -1 |
| 5 | 2 | -1 | -4 | 0 | 1 | -1 | -1 |
| 4 | -5 | 15 | -1 | 0 | 2 | 0 | -1 |
| -5 | 5 | -2 | 3 | 0 | -2 | 1 | -1 |

| 8 | 6 | 5 | 8 | 12 | 20 | 26 | 30 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

| THINNED-OUT COEFFICIENT | CODE | THE NUMBER OF ADDITIONAL BITS |
|---|---|---|
| 0 | 00 | 0 |
| -1,1 | 0111 | 1 |
| -3,-2,2,3 | 1000 | 2 |
| -7,-6,-5,-4,4,5,6,7, | 1001 | 3 |
| -15,⋯-8,8,⋯15 | 1010 | 4 |
| -31,⋯-16,16⋯31 | 1011 | 5 |
| -63⋯-32,32⋯63 | 1101 | 6 |
| -127⋯-64,64⋯127 | 1110 | 7 |

FIG. 27A
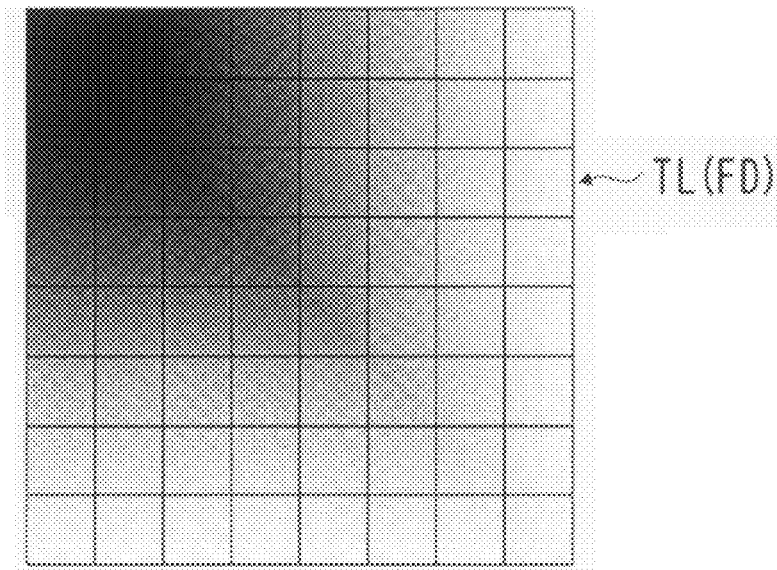
TL(FD)
FIG. 27B
EXAMPLE OF GRADATION IMAGE OF FIRST AVERAGE
EXAMPLE OF GRADATION IMAGE OF SECOND AVERAGE
FIG. 27C
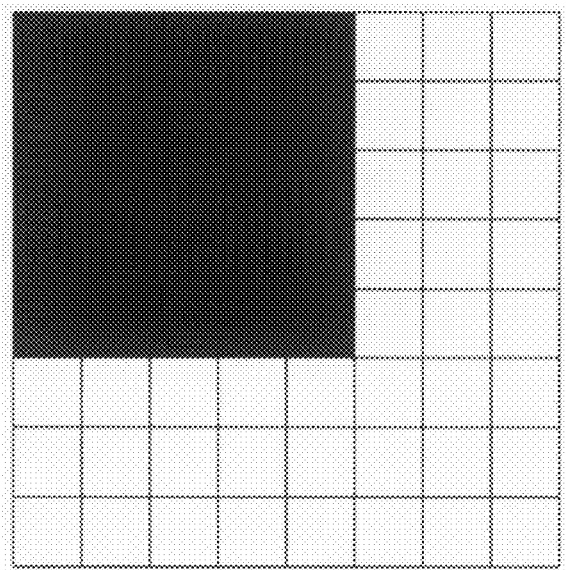

| AVERAGE DIFFERENCE | CODE | THE NUMBER OF ADDITIONAL BITS |
|---|---|---|
| 0 | 00 | 0 |
| -1,1 | 0111 | 1 |
| -3,-2,2,3 | 1000 | 2 |
| -7,-6,-5,-4,4,5,6,7, | 1001 | 3 |
| -15,⋯-8,8,⋯15 | 1010 | 4 |
| -31,⋯-16,16,⋯31 | 1011 | 5 |
| -63⋯-32,32⋯63 | 1101 | 6 |
| -127⋯-64,64⋯127 | 1110 | 7 |

IMAGE DATA COMPRESSION METHOD AND IMAGE DATA COMPRESSION DEVICE

This application is based on Japanese patent application Nos. 2006-106864 and 2007-031892 filed on Apr. 7, 2006 and Feb. 13, 2007, respectively, the contents of which are hereby incorporated by reference.

BACKGROUND OF THE INVENTION

1. Field of the Invention

The present invention relates to an image data compression method and an image data compression device.

2. Description of the Prior Art

In general, a printing apparatus such as a printer or multifunction peripherals (MFP) is equipped with a memory for storing image data to be printed. The printing apparatus starts printing job after the image data that is generated by a personal computer or the like is stored in the memory for usually at least one page (corresponding to approximately 100 megabytes in an uncompressed state).

In consideration of recent requirement for high image quality, data size (data quantity) of an image that is used for printing has a tendency of increasing enormously. If the image data size increases, it is necessary to increase capacity of a memory (memory capacity) that is provided to the printing apparatus so that the increase of the image data size is supported. This will cause an increase in cost. Therefore, it is desirable to reduce the required memory capacity by decreasing the image data size.

Conventionally, various compression techniques have been used for reducing image data size. Among them, there is known JPEG as a typical one. JPEG is one of compression formats of still image data, and it can realize high compression ratio by allowing generation of some deterioration in image quality (by discarding a part of data) when the compression is performed.

However, in a general compression method such as JPEG, the compression ratio varies depending on the image data. Therefore, if the memory capacity of the printing apparatus is reduced based on expectation that the data quantity after the compression becomes small, the data quantity may exceed the memory capacity. If the data quantity exceeds the memory capacity, the printing cannot be performed.

In order to avoid such a situation, it is necessary that the memory has sufficient capacity. Then, however, the memory capacity cannot be reduced after all. In this case, furthermore, the memory that is used should have capacity that can support the case where the compression ratio is the least. Therefore, data quantity after the compression becomes much smaller than the memory capacity in most cases, so there will be excessive memory area as waste. In the case of a printing apparatus that is capable of double side printing, the memory capacity is required to be sufficient for storing image data of at least two pages. If the printing apparatus has a function of sorting, the memory capacity is required to be sufficient for storing image data corresponding to maximum pages that can be sorted. In this printing apparatus, the above-mentioned excessive memory area as waste will further increase. In order to solve this problem, following methods are proposed.

Japanese unexamined patent publication No. 2001-238085 discloses a method in which an image processing apparatus reads an original, and image data of the read original is compressed. An appropriate compression parameter is selected based on the compressed image data. The data is compressed again by using the selected compression parameter so as to generate compressed data.

Japanese unexamined patent publication No. 2005-252573 discloses a method in which an image processing apparatus stores image data in a main memory. Coding is performed based on the stored image data at a plurality of quantization levels. Then, a code length is determined based on the plurality of quantization levels, so as to determine a quantization value that satisfies a target code length and is an optimal quantization value.

Japanese unexamined patent publication No. 2003-69835 discloses a method in which image data is coded with a first coding parameter. If it is decided that coded result will exceed a predetermined size during the coding process, the compression process is switched to use a second coding parameter having higher compression ratio. The part that is already coded with the first coding parameter is decoded and then coded again with the second coding parameter.

By using these compression methods, it is possible to perform compression that is suitable for memory capacity of the printing apparatus, so that the above-mentioned problem can be solved.

However, according to the method of Japanese unexamined patent publication No. 2001-238085 and the method of Japanese unexamined patent publication No. 2005-252573, an experimental compression process has to be performed a plurality of times in order to determine an optimal compression parameter for generating compressed data. Therefore, its process efficiency is lowered.

In addition, the image data to be compressed has to be kept in a memory after being read first time until the compressed data is generated finally or has to be reread every time when the compression process is performed. In the case where the image data is kept in the memory, an additional memory area for its purpose is necessary besides the memory area that is used for the compression process when the compression parameter is determined. Usually, image data has large data quantity, so keeping the image data can be a large load on an apparatus that performs compression. If the memory is occupied, other processes of the apparatus may be troubled. Although it is possible to save the image data in a place except the memory for securing the memory area, process speed may be lowered in that case because swapping occurs every time when the compression process is performed.

In the case where the image data is reread when the compression process is performed, the entire process may be largely delayed because the reading process may take a long time.

In the method described in Japanese unexamined patent publication No. 2003-69835, if the compression process is started with setting of a compression parameter that causes little loss of information quantity in the compression process, i.e., a compression parameter having a low compression ratio, there may be the case frequently where data quantity after the compression exceeds target data quantity. In this case, the compressed image data should be expanded once and be compressed again, so that process time will be increased largely.

On the contrary, if the compression process is started with setting of a compression parameter that causes a lot of loss of information quantity in the compression process, i.e., a compression parameter having a high compression ratio, a lot of information may be discarded needlessly so that unnecessary deterioration in image quality may be caused. Therefore, it is difficult to achieve both optimization of image quality and an increase of process speed.

SUMMARY OF THE INVENTION

An object of the present invention is to provide a compression method for compressing image data to have data quantity less than predetermined target data quantity, in which more free space in a memory area can be secured than the conventional method, and high speed process can be realized while controlling deterioration of image quality below a minimum level.

According to a first aspect of the present invention, an image data compression method for generating compressed data of image data is provided. The method includes the steps of dividing the image data into predetermined regions; generating modeled data by extracting a feature of the image data for each of the regions, the modeled data being data whose image reproducibility varies when a part of the data is thinned out step by step; determining a thinning-out threshold value, the thinning-out threshold value being used when compressed data is generated by thinning out data from the modeled data, and the thinning-out threshold value having a value such that data quantity of the compressed data becomes equal to or less than predetermined target data quantity; and generating compressed data by thinning out data from the modeled data based on the determined thinning-out threshold value.

According to a second aspect of the present invention, the image data may be pseudo gradation image data that is obtained by a pseudo gradation process performed on multi gradation image data with a dither pattern.

According to a third aspect of the present invention, the step of generating the modeled data may include a step of generating a representative value of the image data of each of the regions, and a step of generating an indicator that indicates whether or not a pseudo gradation image dot pattern that is a dot pattern indicated by the pseudo gradation image data can be reproduced correctly when the dot pattern of the region is reproduced based on the representative value.

According to a fourth aspect of the present invention, the step of generating the modeled data may include a step of comparing a reproduced dot pattern that is reproduced based on a representative value of the region and the dither pattern with the pseudo gradation image dot pattern of the region, a step of generating, as the modeled data, data that indicates a representative value of the region in the case where the reproduced dot pattern is the same as the pseudo gradation image dot pattern, and a step of generating, as the modeled data, data that indicates a mismatching degree between the dot patterns, a representative value of the region and the pseudo gradation image dot pattern in the case where the reproduced dot pattern is not the same as the pseudo gradation image dot pattern.

According to a fifth aspect of the present invention, the step of generating compressed data may include a step of deciding which one of the representative value of the region and the pseudo gradation image dot pattern is used as compressed data based on comparison between the mismatching degree between the dot patterns and the thinning-out threshold value with respect to a region in which the reproduced dot pattern is not the same as the pseudo gradation image dot pattern.

According to a sixth aspect of the present invention, the step of generating the modeled data may include a step of performing orthogonal transformation on a density value of the pixel included in the region so that a coefficient is generated.

According to a seventh aspect of the present invention, the orthogonal transformation may be discrete cosine transformation.

According to an eighth aspect of the present invention, the step of generating the modeled data may include a step of determining a quantized coefficient by quantizing the coefficient by a quantization value.

According to a ninth aspect of the present invention, the step of generating compressed data may include a step of determining a thinned-out coefficient based on the quantized coefficient and the thinning-out threshold value.

According to a tenth aspect of the present invention, the step of generating the modeled data may include a step of generating a first value and a second value that is different from the first value from density values of pixels included in the region.

According to an eleventh aspect of the present invention, the first value may be an average of density values of high density pixels included in the region, and the second value may be an average of density values of low density pixels included in the region.

According to a twelfth aspect of the present invention, the step of generating compressed data may include a step of deciding whether the region is indicated by only the first value or by using both the first value and the second value based on a difference between the first value and the second value.

According to the present invention, in the compression process for compressing image data to be within a predetermined target data quantity, more free space can be secured in a memory area than the conventional method, so that the process can be performed at high speed while controlling deterioration of image quality below a minimum level.

BRIEF DESCRIPTION OF THE DRAWINGS

FIG. 8 is a diagram showing an example of modeled data in a first example.

FIG. 9 is a diagram showing an example of a code table about a representative value difference.

FIG. 11 is a diagram showing an example of statistical data.

FIG. 20 is a diagram showing DCT coefficients in the divided region.

FIG. 21 is a diagram showing an example of a quantization table.

FIGS. 22A and 22B are diagrams showing quantized coefficients in the divided region.

FIG. 23 is a diagram showing an example of modeled data in the second example.

FIGS. 24A and 24B are diagrams for explaining thinned-out data in the second example.

FIG. 25 is a diagram showing an example of a code table about thinned-out coefficients.

FIGS. 27A-27C are diagrams for explaining a modeling process by BTC in a third example.

FIG. 28 is a diagram showing an example of a code table that is used for compression by BTC.

DESCRIPTION OF THE PREFERRED EMBODIMENTS

The invention will now be described in detail with reference to the attached drawings.

Figure 1:
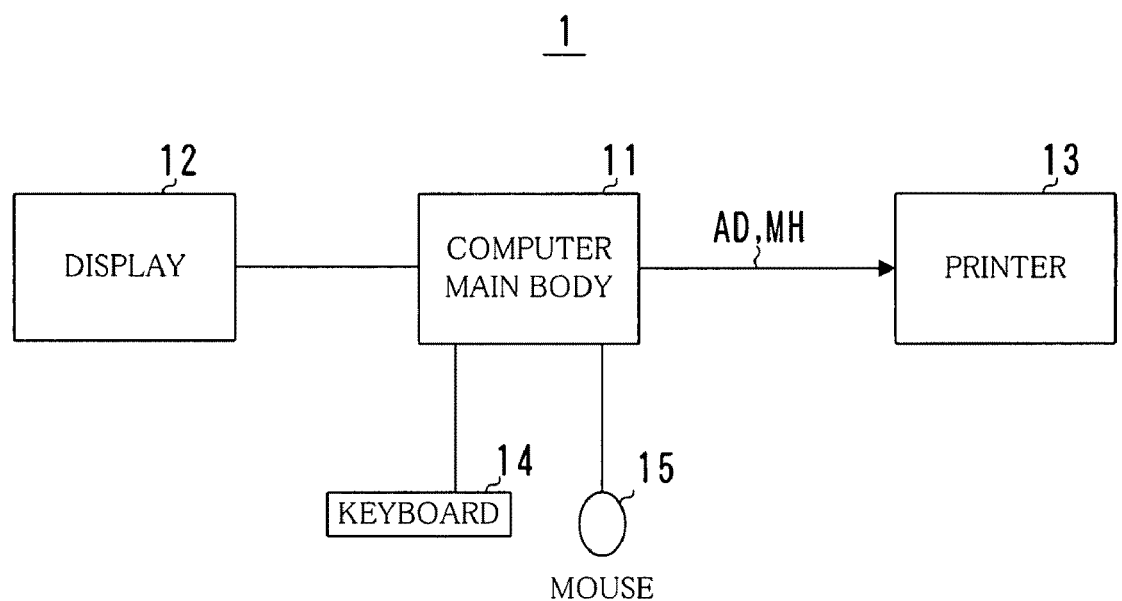
FIG. 1 is a diagram showing a whole structure of a print system to which an image data compression method of the present invention is applied.

In FIG. 1, a print system 1 is a system for printing an image with a printer 13 based on instructions that a user entered from a computer main body 11. The print system 1 is made up of the computer main body 11, a display 12, a keyboard 14, a mouse 15, a printer 13 and the like. The computer main body 11 and the printer 13 are connected to each other via a communication cable such as a USB cable or an RS-232C cable.

The computer main body 11 has a storage medium such as a hard disk that stores image data FD that is supplied externally or is generated inside it. When instructions for executing a print job are given by a user with the keyboard 14 or the mouse 15, the image data FD to be printed with respect to the instructions is compressed to make compressed image data AD, which is transmitted to the printer 13.

The printer 13 receives the compressed image data AD from the computer main body 11, and it stores the data in an internal memory and expands the same for printing. Note that a personal computer, a workstation or the like is used as the computer main body 11. A laser printer, MFP or the like is used as the printer 13.

In the present embodiment, a modeling process is performed when the image data FD is compressed. Then, the image data FD is compressed so that its compressed image data AD has data quantity (size) that is less than a predetermined target data quantity GL and is close to the target data quantity GL. Note that the modeling process is a process for generating a model of an information source by extracting a feature of the image data. Modeled data that is generated as a result of the modeling process is data having image reproducibility that alters when a part thereof is thinned-out step by step.

In an example of the modeling process, data to be compressed is analyzed that codes to be coded are classified and restructured. In some cases, priorities are assigned to them so that unnecessary data are deleted. In an excellent modeling process, a large bias is generated in appearance probabilities of generated codes so that code length is shortened when coding is performed.

According to the present embodiment, data quantity is reduced even in the modeling stage too. In addition, data generated by the modeling process usually has little redundancy. If redundancy is reduced largely by the modeling process, it is difficult to reduce data quantity further largely by coding (to compress additionally). Therefore, there is a case where it is not necessary to perform the modeling process.

Figure 2:
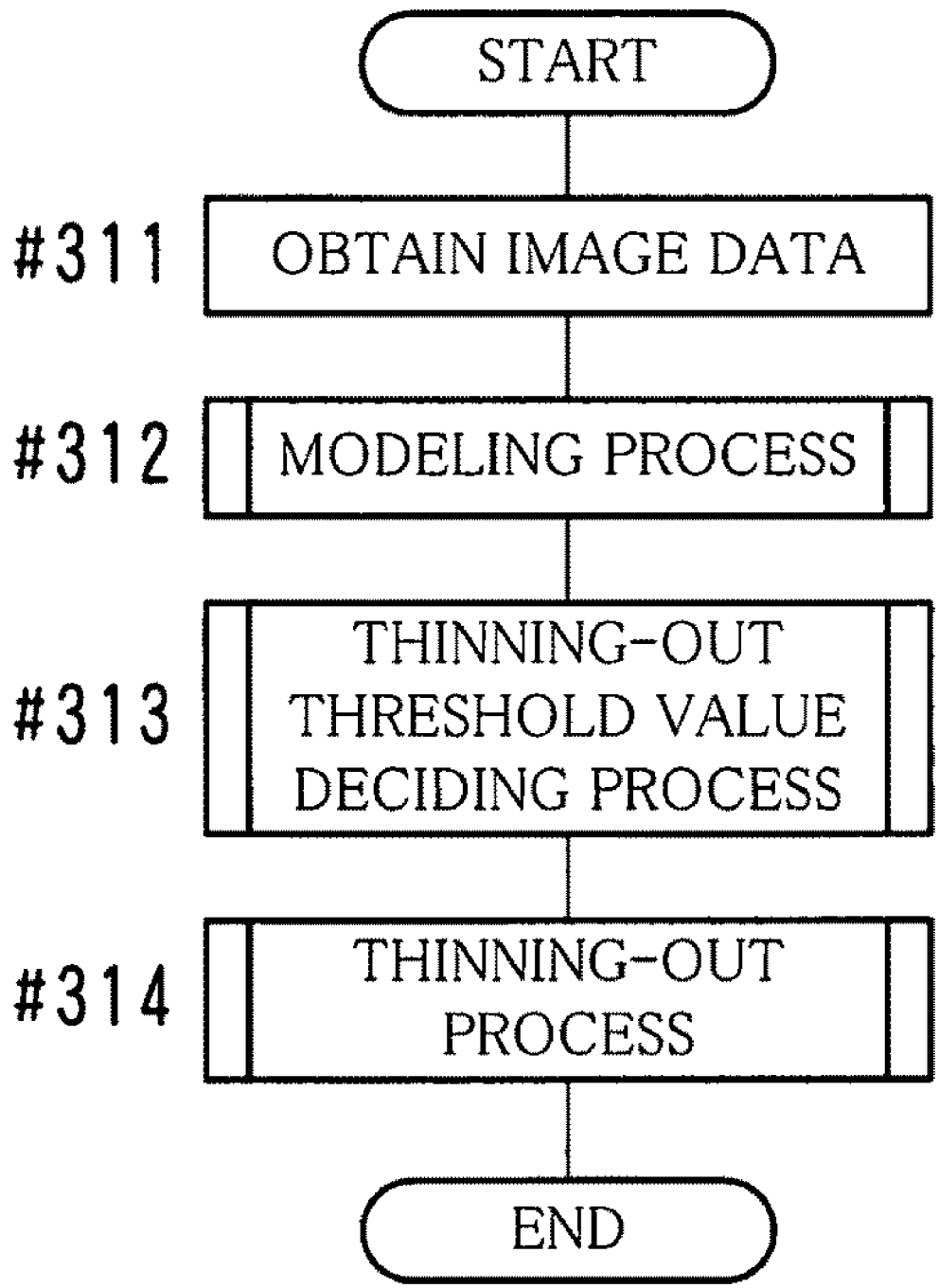
FIG. 2 is a flowchart showing a general process of the compression process.

FIG. 2 shows a general process of the compression process in the present embodiment. In the compression process of the present embodiment, the modeling process is performed on the obtained (#311) image data FD, so that modeled data MD indicating a feature of the image data FD is generated (#312).

Next, trial calculation of a size of the compressed image data AD is performed from the modeled data MD, and a thinning-out threshold value MH (a compression parameter) that is a threshold value to be used for thinning out data from the modeled data MD is decided based on a result of the trial calculation and the target data quantity GL (#313). A thinning-out process is performed for thinning out data from the modeled data MD based on the decided thinning-out threshold value MH so that thinned-out data ED is generated (#314). Then, this thinned-out data ED is coded so that the compressed image data AD is generated. Note that the thinning-out process described here is not limited to simple deletion of data that is already included in the modeled data MD but includes replacing data that is already included with another data having less data quantity.

In the present embodiment, the image data FD or pseudo gradation image data D1, which is read onto the memory as a target of compression for generating the modeled data MD, i.e., from which the modeled data MD is generated, is deleted from the memory area while the modeled data MD is generated. In addition, also when the thinned-out data ED is generated, the modeled data MD that has become unnecessary as conversion into the thinned-out data ED is finished is deleted from the memory area in the same way. Furthermore, also when the compressed image data AD is generated, the modeled data MD and the thinned-out data ED that have become unnecessary as conversion into the compressed image data AD is finished is deleted (discarded) from the memory area in the same way. Thus, the memory area can be used efficiently. However, if there is enough space in the memory area, it is not always necessary to delete data.

Figure 3:
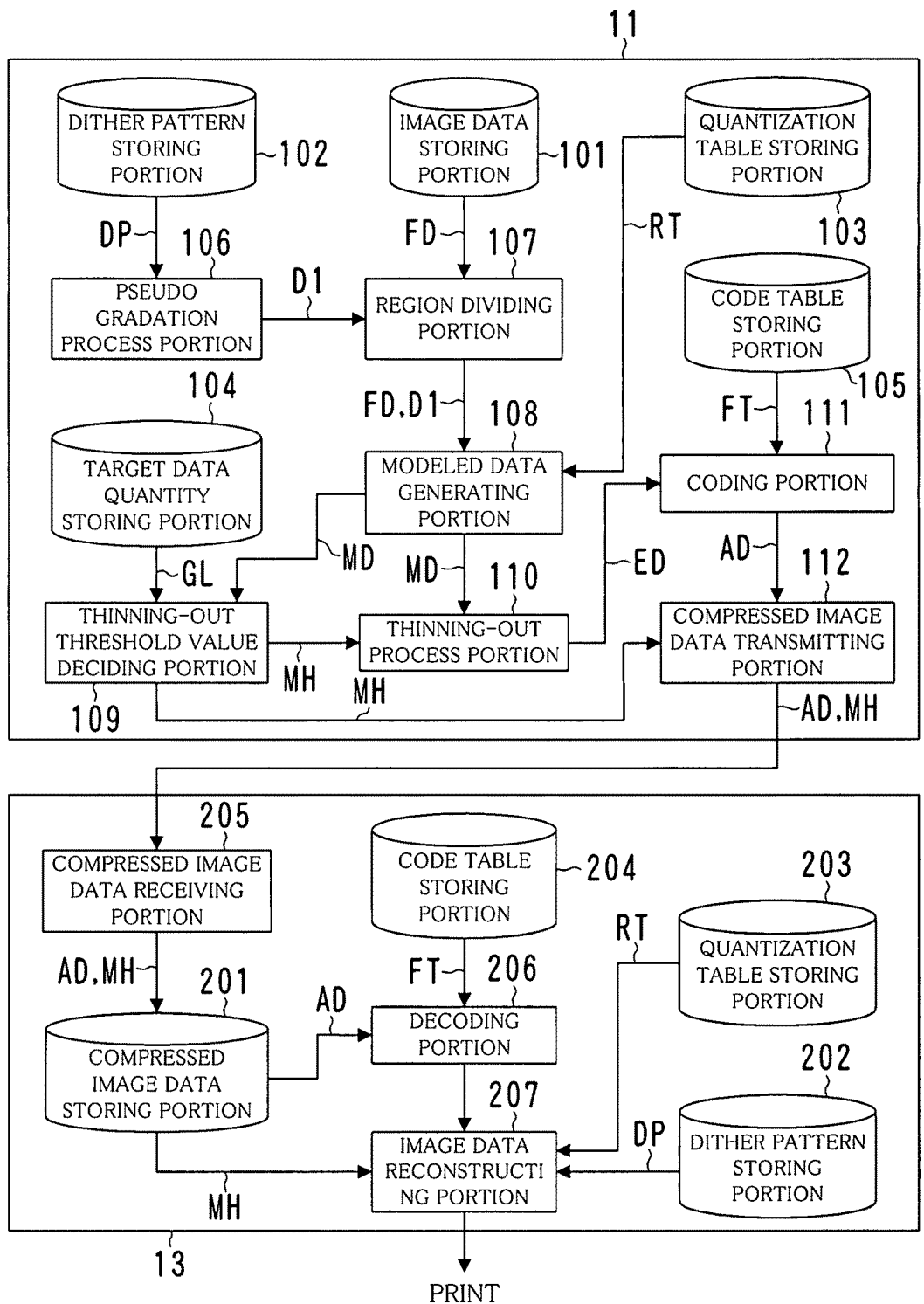
FIG. 3 is a diagram showing an example of a functional structure of the print system.

The computer main body 11 is equipped with functions as shown in FIG. 3, which includes an image data storing portion 101, a dither pattern storing portion 102, a quantization table storing portion 103, a target data quantity storing portion 104, a code table storing portion 105, a pseudo gradation process portion 106, a region dividing portion 107, a modeled data generating portion 108, a thinning-out threshold value deciding portion 109, a thinning-out process portion 110, a coding portion 111, a compressed image data transmitting portion 112 and the like. These functions are realized by installing a computer program in the computer main body 11 so that these functions are performed by the computer main body 11.

The printer 13 is equipped with functions that are a compressed image data storing portion 201, a dither pattern storing portion 202, a quantization table storing portion 203, a code table storing portion 204, a compressed image data receiving portion 205, a decoding portion 206, an image data reconstructing portion 207 and the like.

In FIG. 3, the image data storing portion 101 stores the image data FD having 256 levels of gradation, for example.

The dither pattern storing portions 102 and 202 store a dither pattern DP that is used for a pseudo gradation process of the image data FD.

The quantization table storing portions 103 and 203 store a quantization table RT as shown in FIG. 21. The quantization table RT will be described in detail later.

The target data quantity storing portion 104 stores a target data quantity GL. As the target data quantity GL, a value that is smaller than the memory capacity of the printer 13 is set in advance.

The code table storing portions 105 and 205 store code tables FT1, FT2, FT3 and the like as shown in FIGS. 9, 25 and 28. These code tables FT will be described in detail later. Hereinafter, these code tables FT1, FT2 and FT3 may be collectively referred to as "code tables FT" with omitting the serial numbers. Others may also be referred to with omitting the serial numbers or the like.

The compressed image data storing portion 201 stores the compressed image data AD that is transmitted from the computer main body 11.

In the case of generating the gradation image data D1, when the instructions to print are given by the user, the pseudo gradation process portion 106 of the computer main body 11 obtains the image data FD to be compressed from the image data storing portion 101 and performs the pseudo gradation process with a dither method so that the pseudo gradation image data D1 is generated. When the pseudo gradation process is performed, the dither pattern DP stored in the dither pattern storing portion 102 is used.

The region dividing portion 107 divides the pseudo gradation image data D1 generated by the pseudo gradation process portion 106 into many small regions (blocks). Hereinafter, the region obtained by the division is referred to as a "divided region TL." In addition, a process that is performed on each of the divided regions TL may be described with noticing one divided region TL. In this case, the divided region TL that is noticed may be referred to as a "noted region TL."

Figure 4:
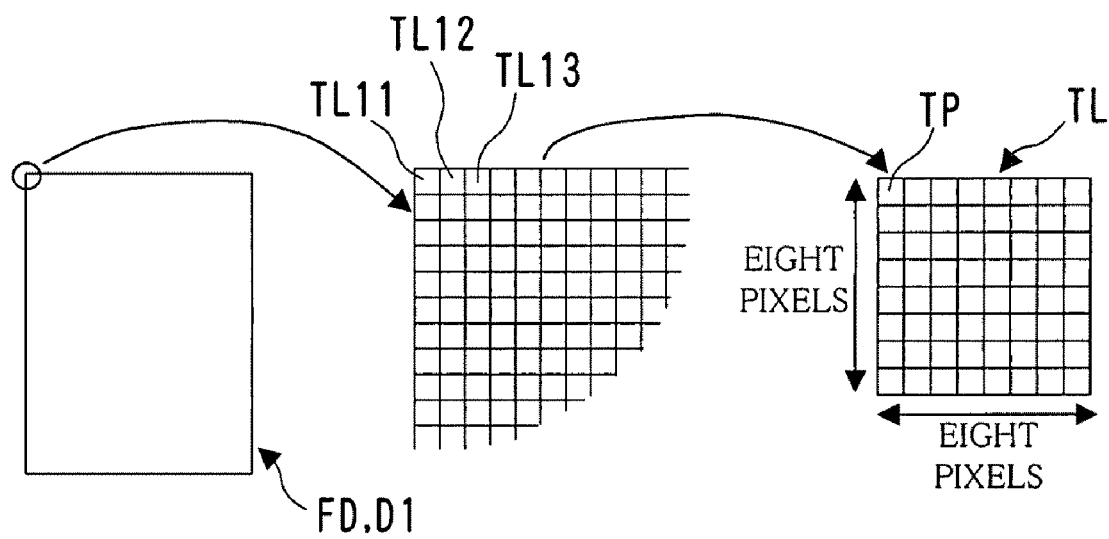
FIG. 4 is a diagram for explaining divided regions.

This divided region TL is a rectangular region made up of 64 (8×8) pixels TP as shown in FIG. 4, for example. In the example shown in FIG. 4, the whole region of the image data FD is divided into blocks from the upper left to the lower right sequentially, so as to make divided regions TL11, TL12, TL13, and so on from the upper left toward the right side, and divided regions TL21, TL22, TL23, and so on in the next row, until a divided region TLmn.

In addition, the region dividing portion 107 may obtain the image data FD that is data of a gradation image from the image data storing portion 101 directly. In this case too, the image data FD is divided into the divided regions TL in the same manner as the pseudo gradation image data D1.

The modeled data generating portion 108 performs the modeling process so as to generate the modeled data MD from the image data FD or the pseudo gradation image data D1. This modeling process is performed on each of the divided regions TL, and the modeled data MD1, MD2, MD3, and so on are generated with respect to the regions TL1, TL2, TL3, and so on.

The thinning-out threshold value deciding portion 109 decides the thinning-out threshold value MH based on the modeled data MD and the target data quantity GL that is stored in the target data quantity storing portion 104. This decision is performed as follows, for example.

First, trial calculation of data quantity of the compressed image data AD is performed in the case of using the thinning-out threshold value MH at which least data are thinned out (at highest image quality) by the thinning-out process. If data quantity of a result of the trial calculation is less than the target data quantity GL, the thinning-out threshold value MH is determined to be a thinning-out threshold value MH that is used in the actual thinning-out process.

If the data quantity as a result of the trial calculation is more than or equal to the target data quantity GL, trial calculation of the data quantity of the compressed image data AD is performed in the case where the thinning-out threshold value MH is further increased. Then, the thinning-out threshold value MH at which the data quantity as a result of the trial calculation is less than the target data quantity is determined, and the thinning-out threshold value MH is determined to be a thinning-out threshold value MH that is used in the actual thinning-out process.

The thinning-out process portion 110 performs the thinning-out process using the thinning-out threshold value MH decided by the thinning-out threshold value deciding portion 109 and the modeled data MD, so that the thinned-out data ED is generated.

The coding portion 111 generates the compressed image data AD by coding the thinned-out data ED. The compressed image data transmitting portion 110 transmits the compressed image data AD to the printer 13 together with the thinning-out threshold value MH that was used in the thinning-out process performed by the thinning-out process portion 110.

The compressed image data receiving portion 204 of the printer 13 receives the compressed image data AD and the thinning-out threshold value MH that are transmitted from the computer main body 11 and stores them in the compressed image data storing portion 201.

The decoding portion 206 obtains the compressed image data AD stored in the compressed image data storing portion 201. The obtained compressed image data AD is decoded by using the code tables FT stored in the code table storing portion 204.

The image data reconstructing portion 207 reproduces (reconstructs) or approximately reproduces the pseudo gradation image data D1 or the image data FD from the data decoded by the decoding portion 206. In this process, the thinning-out threshold value MH stored in the compressed image data storing portion 201, the dither pattern stored in the dither pattern storing portion 202, and the quantization table RT stored in the quantization table storing portion 203 are used if necessary.

Hereinafter, a concrete compression method in the present embodiment is divided roughly into a "first example", a "second example" and a "third example", and the "modeling process", the "thinning-out threshold value deciding process" and the "thinning-out process" shown in FIG. 2 will be described further in detail.

FIRST EXAMPLE

In the present example, a representative value is decided for each of the divided regions TL of the pseudo gradation image data D1, and the representative value is used for generating the compressed image data AD. The representative value as to the divided region TL is a value that represents density values in the divided region TL directly or indirectly. By using the representative value and the dither pattern DP, it is possible to reproduce the original pseudo gradation image or an image that is similar to the same. Hereinafter, the process of the present example will be described by dividing it into items including a "modeling process", a "thinning-out process", a "coding process", a "thinning-out threshold value deciding process" and the like.

[Modeling Process]

When the modeling process is performed, a representative value of each of the divided regions TL is decided first. Here, the number of dots included in the divided region TL is used as the representative value of the divided region TL.

Figures 5A, 5B:
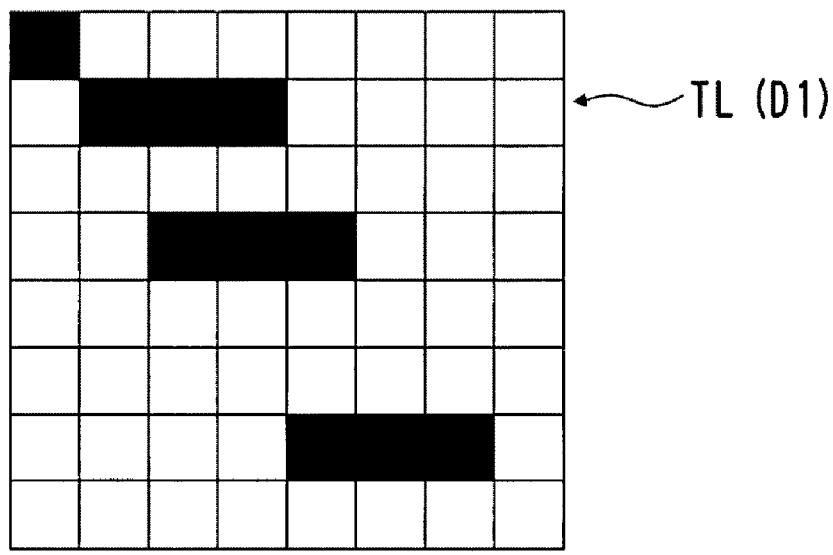
FIGS. 5A and 5B are diagrams showing an example of the divided region and a dither pattern.

In FIG. 5A, black pixels in the divided region TL are dotted pixels. In the pseudo gradation process a image data D1 of the present embodiment, if a density value of each pixel of the image data FD is more than or equal to a threshold value of the corresponding pixel of the dither pattern DP shown in FIG. 5B, the pixel is dotted. In other words, the larger the density value is, the higher the density is. In the example shown in FIG. 5A, the representative value of the divided region TL is the number of dots, that is, "10".

Although the example shown in FIGS. 5A and 5B is an example where the division is performed so that a size of the divided region TL becomes the same as a size of the dither pattern DP, these sizes may be different from each other.

Figure 6:
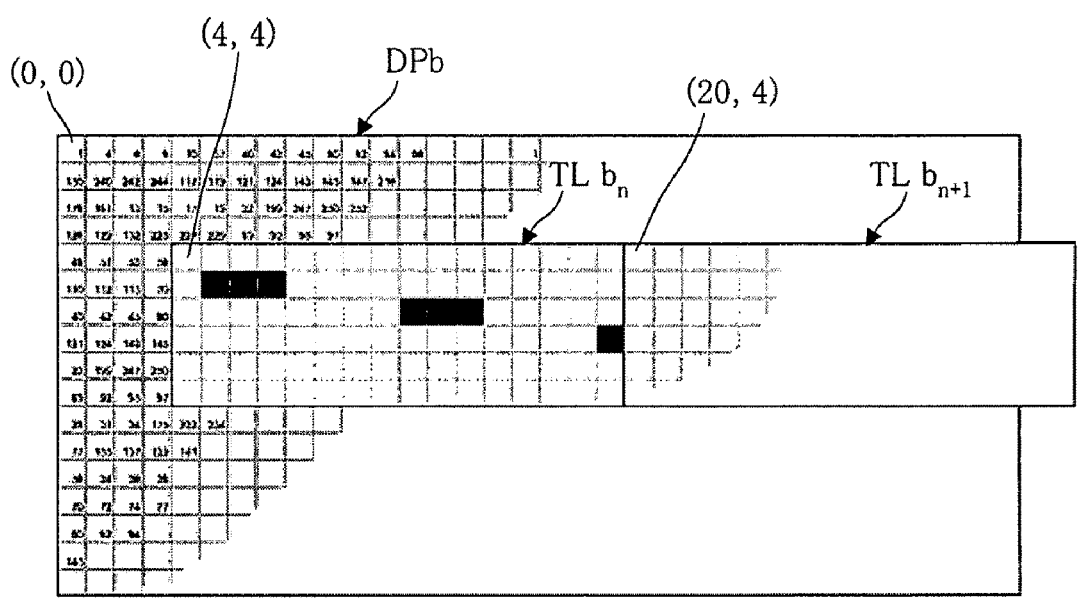
FIG. 6 is a diagram showing an example of the divided region and the dither pattern having different sizes.

For example, as shown in FIG. 6, the size of the divided region TLb can be smaller than the size of the dither pattern DPb. On the contrary to the case of FIG. 6, the size of the divided region TL can be larger than the size of the dither pattern DP. Hereinafter, an arrangement pattern (a dot pattern) of dots of the pseudo gradation image data D1 of the divided region TL as shown in FIG. 5A may be referred to as a "pseudo gradation image dot pattern."

When the representative value is determined for each of the divided regions TL, the representative value is used for generating the modeled data MD for each of the divided regions TL. In this case, when the noted region TL that is one of the divided regions TL is noticed, a reproduced dot pattern is determined, which is a dot pattern to be reproduced by the representative value of the noted region TL and the dither pattern DP that was used in the pseudo gradation process.

In the present example, the size of the divided region TL has 64 pixels (8×8 pixels). In this case, the number of dots (the representative value) is considered to be an average value of density values in the divided region TL in the case where the image data FD has 64 levels of gradation, for example. Therefore, a value that is obtained by multiplying the representative value by 256/64 can be regarded as an average (virtual average) of density values in the divided region TL in the case where the image data FD has 256 levels of gradation.

For example, if the representative value of the noted region TL is "10", 10×256/64=36, so the virtual average is "36."

Figure 7:
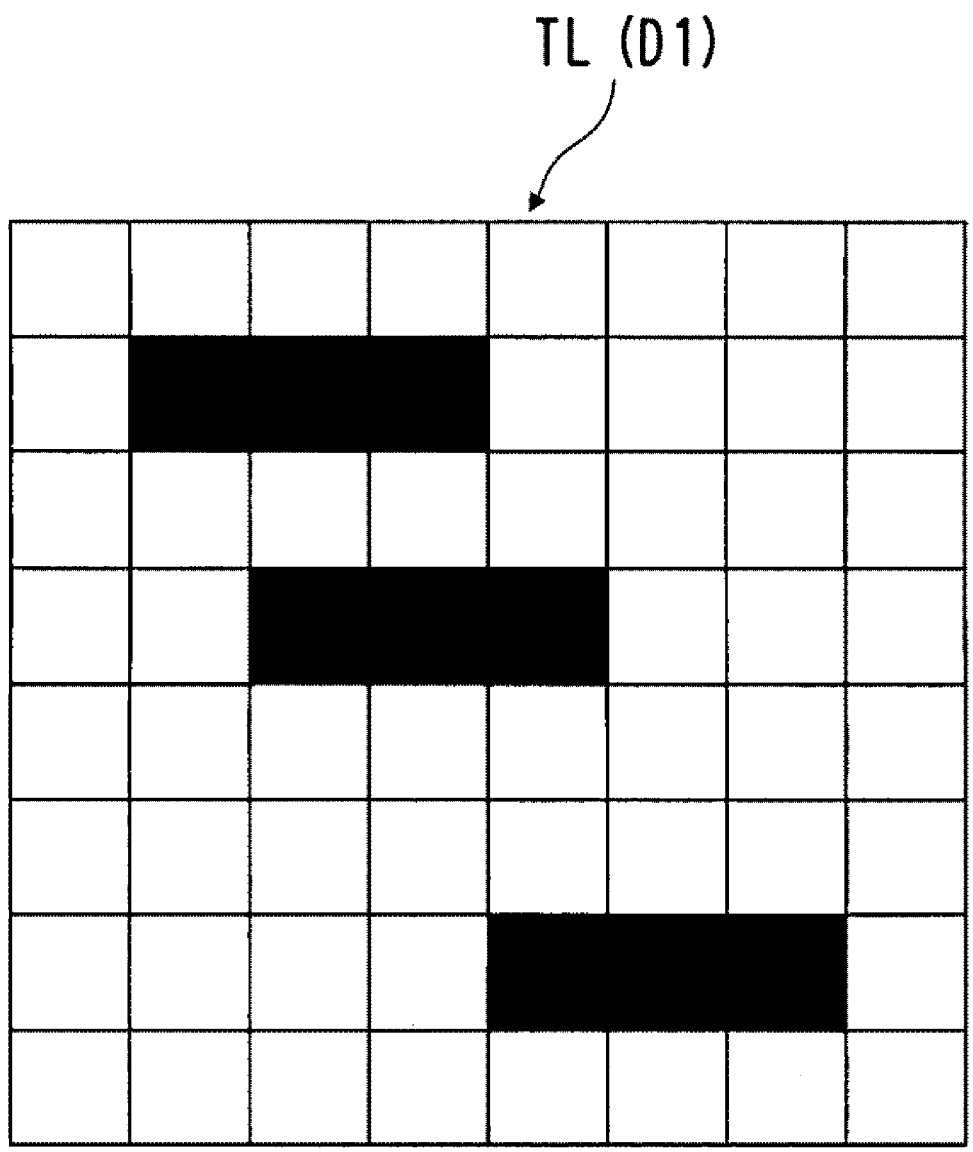
FIG. 7 is a diagram showing an example of a reproduced dot pattern.

The reproduced dot pattern can be determined by performing pseudo gradation process with the dither pattern DP on each density value in the noted region TL in the case where it is supposed that the density values in the noted region TL are uniformly the virtual average described above. More specifically, the virtual average is compared with a density value of each pixel in the dither pattern DP, and a pixel in which the virtual average is larger is dotted. Then, a dot pattern that is reproduced in this way is the reproduced dot pattern. If the virtual average is "36" by using the above-mentioned example, the reproduced dot pattern as shown in FIG. 7 is determined with the dither pattern DP shown in FIG. 5B.

After the reproduced dot pattern is determined for the noted region TL as described above, the reproduced dot pattern is compared with the pseudo gradation image dot pattern. If they are the same, the modeled data MD indicating the representative value of the noted region TL is generated.

If the reproduced dot pattern is not the same as the pseudo gradation image dot pattern, the modeled data MD indicating the number of unmatching dots, the representative value of the noted region TL and the pseudo gradation image dot pattern of the noted region TL is generated.

In the example of FIG. 5A, the representative value of the pseudo gradation image dot pattern of the divided region TL is "10". When the reproduced dot pattern is determined using this representative value and the dither pattern shown in FIG. 5B, the result is as shown in FIG. 7 as described above. Therefore, in this case, the pseudo gradation image dot pattern is not the same as the reproduced dot pattern, and the number of unmatching dots is "1".

The process as described above is performed for every divided region TL, and the modeled data MD is generated for each divided region TL. Note that it is possible that the modeled data MD includes not the representative value but other value for determining the representative value. For example, it is possible to use a difference with a representative value of the divided region TL that is processed just before.

Next, the modeled data MD in the present example will be described with reference to FIG. 8. Note that the representative value, the pseudo gradation image dot pattern and the number of unmatching dots are referred to as the "representative value AP", the "pseudo gradation image dot pattern AR" and the "the number of unmatching dots AN", respectively.

FIG. 8 shows the modeled data MD generated for the divided regions TL1, TL2, TL3 and so on, and data quantity (the number of bits) of each value that is an element of the modeled data MD. As to the divided region TL in which the reproduced dot pattern matches the pseudo gradation image dot pattern AR (the divided regions TL1, TL2, TL3 and the like), only the representative value AP is indicated as the modeled data MD.

In addition, as to the divided region TL in which the dot patterns don't match each other (the divided region TL4 and the like), a switch flag AF ("F" in FIG. 8) that indicates that they don't match, the representative value AP, the pseudo gradation image dot pattern AR ("D" in FIG. 8) and the number of unmatching dots AN are indicated. Hereinafter, the divided region TL in which the reproduced dot pattern matches the pseudo gradation image dot pattern AR may be referred to as a "matching divided region TLx", while the divided region TL in which the dot patterns don't match may be referred to as an "unmatching divided region TLy."

The pseudo gradation image dot pattern AR is determined by scanning pixels from the upper left end sequentially in the divided region TL with regarding a value of a dotted pixel as "1" and a value of an undotted pixel as "0", for example.

The data quantity of each value indicated in the modeled data MD is indicated in the row of "the number of bits" in FIG. 8. In the divided region TL including 64 pixels as shown in FIGS. 5A and 5B, the representative value AP can be a value within the range from 0 to 64, and the total number of them is 65 (corresponding to 7 bits). The switch flag AF is added to them to be the total number 66, so that the representative value AP and the switch flag AF are indicated with 7 bits.

Since a dot of one pixel can be indicated with one bit as to the pseudo gradation image dot pattern AR, one divided region TL (64 pixels) can be indicated with 64 bits.

The number of values that can be the number of unmatching dots AN is 64 in the divided region TL including 64 pixels as shown in FIGS. 5A and 5B, so it can be indicated with 6 bits.

Note that in many divided regions TL, the pseudo gradation image dot pattern AR thereof can be reproduced with the representative value AP. In other words, data quantity of 64 bits can be reduced to data quantity of 7 bits in many divided regions TL. Therefore, it is possible to reduce data quantity at the time point of this modeling process too.

[Thinning-Out Process]

In the thinning-out process, a process of thinning out data from the modeled data MD is performed based on the thinning-out threshold value MH. In this case, the thinning-out threshold value MH is a value that indicates what extent deterioration in image quality can be permitted by the thinning-out process. In the present example, the number of unmatching dots is used as an indicator of deterioration in the image quality. Therefore, in this thinning-out process, it is decided which of the representative value and the pseudo gradation image dot pattern should be used for generating the thinned-out data ED based on comparison between the number of unmatching dots included in the modeled data MD and the thinning-out threshold value MH in the case where the noted region TL is noticed, and the thinned-out data ED is generated by using the decided one. Note that this thinning-out threshold value MH is decided prior to the thinning-out process. This decision method will be described in detail later in the section of "[thinning-out threshold value deciding process]."

When this process is performed, the modeled data MD is read for one divided region TL. If the read modeled data MD indicates the switch flag, it means that the modeled data MD is modeled data MD for the unmatching divided region TLy. In this case, the number of unmatching dots indicated in the modeled data MD is compared with the thinning-out threshold value MH.

If the number of unmatching dots is less than or equal to the thinning-out threshold value MH, the thinned-out data ED is generated by using the representative value indicated in the modeled data MD.

If the number of unmatching dots is larger than the thinning-out threshold value MH, the thinned-out data ED is generated by using the pseudo gradation image dot pattern and the switch flag indicated in the modeled data MD.

If the switch flag is not indicated in the modeled data MD, it means that the modeled data MD is modeled data MD of the matching divided region TLx. In this case, the thinned-out data ED is generated by using the representative value indicated in the modeled data MD.

According to the thinning-out process as described above, a lot of data quantity is further reduced from the modeled data MD.

[Coding Process]

In the coding process, the compressed image data AD is generated by coding the generated thinned-out data ED. In other words, the coding process is performed with respect to the representative value and the pseudo gradation image dot pattern indicated in the thinned-out data ED. As to the representative value, a representative value deriving value is determined first for determining the representative value, and it is coded. In the present example, as this representative value deriving value, a difference between the representative value of the noted region TL and the representative value of the just previous divided region TL (representative value difference) is used when the noted region TL is noticed. If the representative value is not indicated in the thinned-out data ED of the just previous divided region TL, the difference is determined with regarding that the representative value was "0". In other words, the difference in this case becomes the representative value of the noted region LT itself. Note that the just previous divided region TL can be a region that is read in just before the noted region TL (i.e., the left neighboring region) when the modeling is performed or a region on which the coding process or the like is performed just before the noted region TL.

Figure 10:
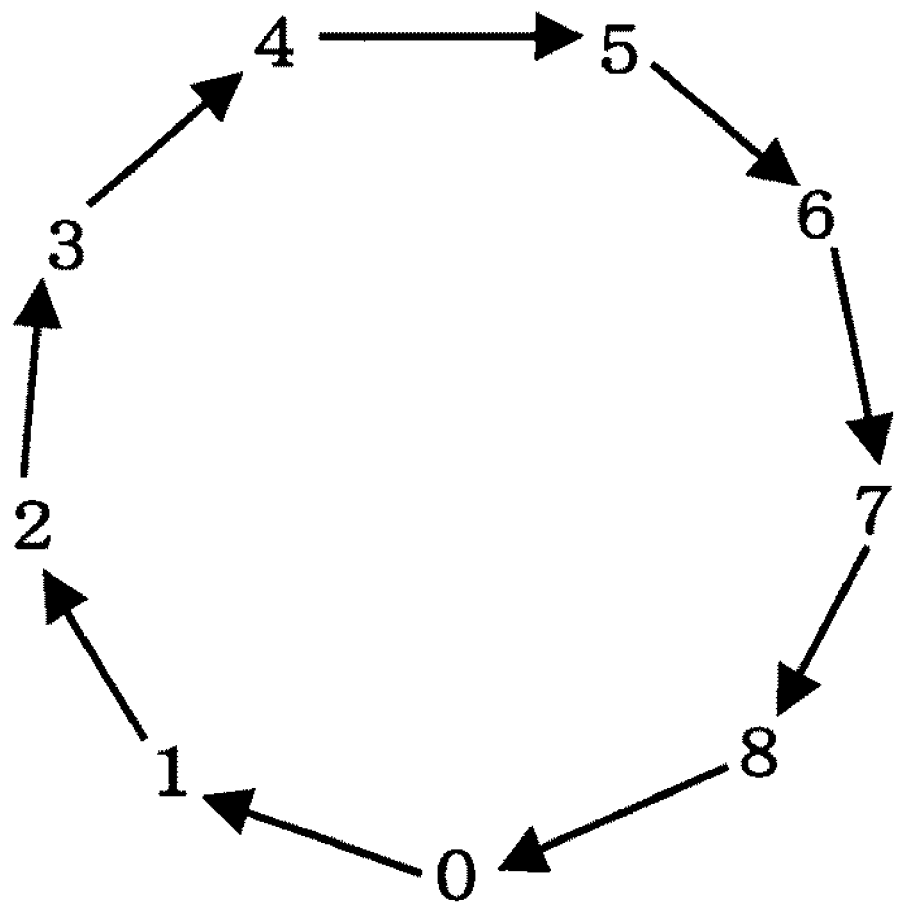
FIG. 10 is a diagram for explaining cyclic integers.

In the present example, a method of using cyclic integers shown in FIG. 10 is used for showing the representative value difference. Hereinafter, the cyclic integers will be described.

FIG. 10 shows a circle JS for explaining a method of using the cyclic integers. When a position of a certain number A is regarded as a reference point so as to determine a difference C between the number A and another number B, the circle JS is rotated from the position of the number A in the circle JS in the right-handed direction by the number of positions corresponding to the number B. Then, the value that stops at the reference point is the difference C. For example, the difference between "5" and "3" is obtained by rotating the circle JS from the "5" position in the circle JS that is the reference point in the right-handed direction by three, and "2" that comes to the reference point is the result. As another example, the difference between "0" and "8" is obtained by rotating the circle JS from the "0" position in the circle JS that is the reference point in the right-handed direction by eight, and "1" that comes to the reference point is the result. In this way, the difference can be obtained as an integer within the range of 0-8.

In addition, a certain number A can be obtained by adding a difference C to a certain number B. In this case, the position of the number B in the circle JS is regarded as a reference point, and the circle JS is rotated in the left-handed direction by the number of positions corresponding to the difference C. Then, the value that comes to the position of the reference point is regarded as the number A. In this way, the number A can be reproduced completely from the number B and the difference C.

Since the maximum value of the representative value is "64", the range of the representative value difference is usually from "−64" to "64". This can be expressed by the range from "−32" to "32" by using the method as described above. In the present example, the representative value difference within the range from "−32" to "32" that is determined in this way is coded with the code table FT1 shown in FIG. 9.

In FIG. 9, the code table FT1 includes items of a "representative value difference", a "code" and "the number of additional bits." The item "representative value difference" indicates one or more representative value differences to be coded. The item "code" indicates the first half of the code that is assigned to the representative value difference of the corresponding row. The item "the number of additional bits" indicates the number of bits of the second half of the code that is assigned to the representative value difference of the corresponding row.

When the third row of the code table FT1 is exemplified, the code of "011" is assigned to the first three bits of the code of each of the representative value difference "−3", "−2", "2" and "3". Furthermore, a code of 2 bits indicated in "the number of additional bits" is added to the second half. Here, it is arranged so that a code of a small value is assigned in the order from the difference value of a small value. In other words, codes of "01100", "01101", "01110" and "01111" are assigned to the representative value differences "−3", "2", "−2" and "3", respectively. A code of the last row of the representative value coding table is assigned to the switch flag that was described in the modeling process. The representative value difference can be expressed with 2-9 bits by the coding process as described above.

Since the representative value is a value that is related to density of the image, there is a deep connection between neighboring (close) divided regions TL. The representative values of such divided regions TL are close to each other. In other words, a difference between densities of neighboring divided regions TL is small, so there is little difference between the representative values. Therefore, if a difference between the representative value of a certain divided region TL and the representative value of the divided region TL that was obtained just before is determined, the difference is "0" in many cases. Therefore, the representative value difference can be expressed with 2 bits in many cases. As a whole, the code length becomes approximately 4 bits in average. Since the representative value has the maximum value of 64 with data quantity of 6 bits originally, it is considered that approximately 1 bit in average of the data quantity was reduced for one divided region TL by this coding process.

In addition, since a difference of the representative value between the neighboring divided regions TL has a large bias of statistical frequency of occurrence, it is very effective to use Huffman method for the coding process.

As to the pseudo gradation image dot pattern, the coding process is performed by using the Huffman method. In the present embodiment, the dot pattern indicated in each row of the divided region TL is coded. Thus, the pseudo gradation image dot pattern of one divided region TL can be expressed by the code having length of approximately 30 bits in average. Since data quantity of the pseudo gradation image dot pattern having 64 pixels is 64 bits, data quantity can be reduced by approximately 30 bits in average in this way.

Although the example of the case where the representative value difference is coded is described here, it is possible to code the representative value as it is.

[Decision of the Thinning-Out Threshold Value]

The thinning-out threshold value MH is determined by using the modeled data MD generated by the modeling process. In other words, the trial calculation of data quantity of the whole compressed image data AD is performed, which is generated via the thinning-out process for thinning out the data from the modeled data MD based on the thinning-out threshold value MH. Then, the thinning-out threshold value MH such that the data quantity becomes less than the target data quantity GL is determined, and it is determined to be the thinning-out threshold value MH.

It is possible to reduce data quantity of the matching divided region TLx largely by expressing the pseudo gradation image dot pattern (64 bits) with the representative value (7 bits).

As to the unmatching divided region TLy, image quality thereof is deteriorated when the representative value is used for expressing the pseudo gradation image dot pattern. However, since the divided region TL is sufficiently small region, such deterioration is not so conspicuous. For this reason, even if a mismatch between the reproduced dot pattern and the pseudo gradation image dot pattern is permitted to some extent so that the pseudo gradation image dot pattern is expressed by using the representative value, sufficient image quality can be maintained. In other words, also for the unmatching divided region TLy, data quantity can be reduced largely by using the representative value if some deterioration in the image quality is permitted.

When the thinning-out threshold value MH is decided, trial calculation of the data quantity of the compressed image data AD is performed so that the number of unmatching dots to be permitted for making the data quantity less than the target data quantity GL is determined, and it is determined to be the thinning-out threshold value MH.

Next, a method of the trial calculation of the data quantity of the compressed image data AD using the statistical data TK will be described.

First, trial calculation of the data quantity of the thinned-out data ED is performed. On this occasion, trial calculation of the data quantity is performed first in the case where the thinned-out data ED is generated with the thinning-out threshold value MH being set to "0".

According to the example shown in FIG. 8, data quantity of the modeled data MD of the matching divided region TLx is 7 bits. As to the matching divided region TLx, the representative value indicated in the modeled data MD is used as it is for the thinned-out data ED, so the data quantity remains to be 7 bits. In this case, data quantity of the thinned-out data ED can further be reduced to approximately 4 bits by the coding process.

The data quantity of the modeled data MD of the unmatching divided region TLy is 84 bits (7+7+64+6 bits). As to the unmatching divided region TLy, if the number of unmatching dots is less than or equal to the thinning-out threshold value MH, the representative value is used for generating the thinned-out data ED. Therefore, data quantity after the coding process in this case becomes approximately 4 bits similarly to the matching divided region TLx.

In addition, if the number of unmatching dots is larger than the thinning-out threshold value MH, the switch flag (7 bits) and the pseudo gradation image dot pattern (64 bits) are used for generating the thinned-out data ED. Therefore, data quantity of the thinned-out data ED becomes 71 bits, and it further becomes approximately 33 bits [data quantity of the pseudo gradation image dot pattern (approximately 30 bits)+data quantity of the switch flag (3 bits)] by the coding process.

If "0" is used as the thinning-out threshold value MH, the number of unmatching dots always becomes larger than the thinning-out threshold value MH, so data quantity of the compressed image data AD of the unmatching divided region TLy becomes approximately 33 bits. Concerning the matching divided region TLx, as already described above, data quantity of the compressed image data AD is approximately 4 bits. Therefore, total data quantity of the compressed image data AD of all divided regions TL can be determined by the trial calculation using the following expression.

$$\text{(the number of matching divided regions TLx)} \times 4 + \text{(the number of unmatching divided regions TLy)} \times 33 \quad (1)$$

The numbers of the matching divided region TLx and the unmatching divided region TLy can be known easily by generating statistical data together with the modeling process. This statistical data will be described in detail later.

If the data quantity obtained by this trial calculation is smaller than the target data quantity GL, the thinning-out threshold value MH is determined to be "0". On the contrary, if the data quantity is larger than the target data quantity GL, trial calculation of the data quantity of the compressed image data AD is performed in the case where the thinning-out process is performed with the thinning-out threshold value MH having larger value.

When the trial calculation of the data quantity is performed, it is determined first how much data quantity is reduced by increasing the thinning-out threshold value MH. If the thinning-out threshold value MH is increased, the representative value can be used instead of the pseudo gradation image dot pattern for generating the thinned-out data ED of the unmatching divided region TLy in which the number of unmatching dots becomes smaller than the thinning-out threshold value MH. When the number of unmatching divided regions TLy is "N", the data quantity that is reduced by increasing the thinning-out threshold value MH can be determined as follows.

$$N \times (33-4) \quad (2)$$

In order to know the number of unmatching divided regions TLy with respect to the number of unmatching dots, it is effective to determine the statistical data as shown in FIG. 11 at the stage of the modeling process.

In FIG. 11, each row shows the number of unmatching divided regions TLy corresponding to the number of unmatching dots as the "the number of regions." This statistical data TK counts up by one the number of regions with respect to the number of unmatching dots when the number of unmatching dots of the divided region TL that was a process target in the modeling process is determined. This process is performed with respect to all the divided regions TL.

According to the example shown in FIG. 11, the pseudo gradation image data D1 includes 21,781 divided regions TL in which the number of unmatching dots is "0", 9,720 divided regions TL in which the number of unmatching dots is "1" and 4,413 divided regions TL in which the number of unmatching dots is "2".

The trial calculation of the data quantity of the compressed image data AD when the thinning-out threshold value MH is increased can be performed by subtracting the data quantity that can be determined by the expression (2) from the data quantity of the compressed image data AD obtained by the trial calculation with the thinning-out threshold value MH being "0". Then, a value of the thinning-out threshold value MH in the case where the data quantity obtained by the trial calculation is less than or equal to the target data quantity GL is determined to be the thinning-out threshold value MH that is used for the actual thinning-out process.

In the present example, the trial calculation of the data quantity of a sum of the compressed image data AD is performed regarding that an average of the code length in the case where the coding process of the representative value difference is performed by using the coding table shown in FIG. 9 is approximately 4 bits, and the thinning-out threshold value MH is determined based on the result. It is possible to determine the thinning-out threshold value MH by using graphs as shown in FIGS. 12A and 12B.

Figure 12A:
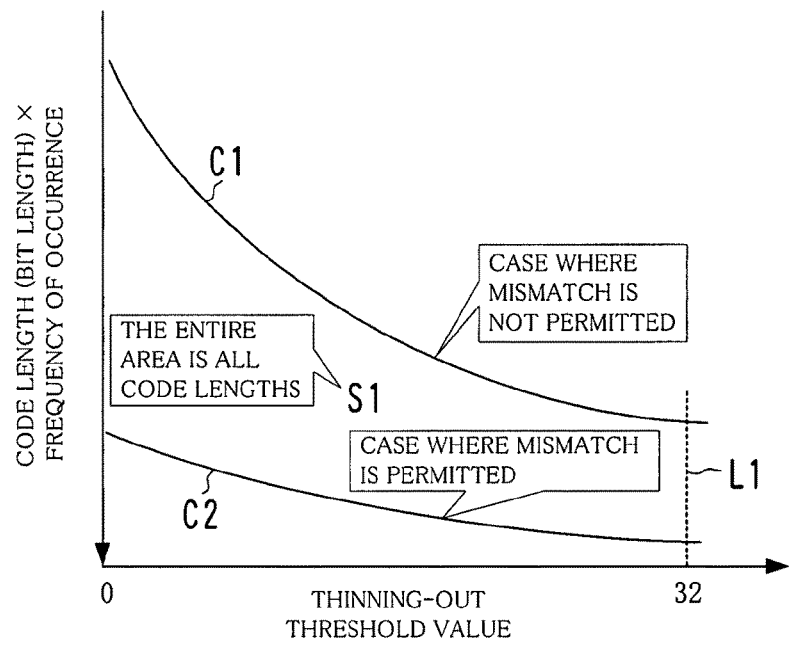
FIGS. 12A and 12B are diagrams showing a relationship between a thinning-out threshold value and data quantity of compressed image data.

FIG. 12A shows a curve C1 and a curve C2 that are graphs indicating relationships among the frequency of occurrence of codes, a code length (a bit length) of the code, the thinning-out threshold value MH and the data quantity of the compressed image data AD. The curve C1 corresponds to the case where a mismatch between the pseudo gradation image dot pattern and the reproduced dot pattern is not permitted. The curve C2 corresponds to the case where a mismatch between them is permitted. In addition, the y-axis of this graph indicates a product of the code length and the frequency of occurrence. The x-axis indicates the thinning-out threshold value MH.

Here, the area S1 of the region defined by the curve C1, a straight line L1, the x-axis and the y-axis is data quantity of the compressed image data AD in the case where thinning-out threshold value MH is "0".

Figure 12B:
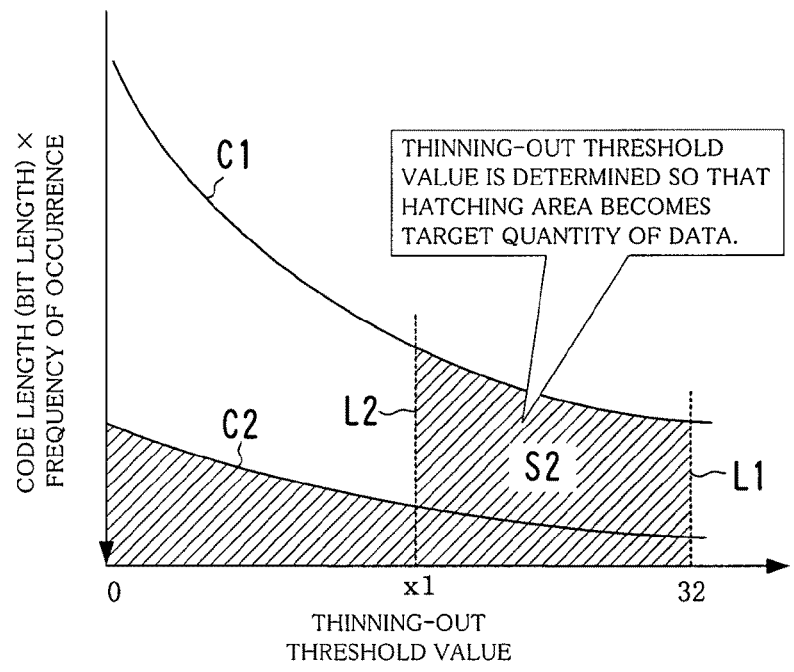

When the thinning-out threshold value MH is increased, data quantity of the compressed image data AD alters to a value of the area S2 of the region shown with hatching in FIG. 12B.

Therefore, when a straight line L2 that defines the area S2 to be smaller than the target data quantity GL is determined, a value x1 of the intersection of the straight line L2 and the x-axis is the thinning-out threshold value MH to be obtained.

[Expansion Process]

In the expansion process, the compressed image data AD is decoded first based on the code table FT1 so that the thinned-out data ED is reproduced.

When the pseudo gradation image data D1 of each divided region TL is reproduced from the thinned-out data ED with respect to the noted region TL, if the thinned-out data ED of the noted region TL includes the switch flag, the pseudo gradation image dot pattern is extracted from the thinned-out data ED, and it is regarded as the dot pattern of the noted region TL.

If the thinned-out data ED of the noted region TL does not include the switch flag, the representative value difference is extracted from the thinned-out data ED, and the representative value of the noted region TL is determined. The dot pattern of the noted region TL is reproduced by using the dither pattern that was used for the pseudo gradation process when the pseudo gradation image data D1 of the compressed image data AD was generated and the obtained representative value. Note that the dither pattern can be stored in advance in the memory or the like of the printer 13 that performs the expansion process, or a structure is possible in which the compressed image data AD and the dither pattern corresponding to the same are transmitted from the computer main body 11.

The representative value of the noted region TL can be determined by calculating the sum of the representative value of the just previous divided region TL of the noted region TL and the representative value difference. Note that if the representative value is not used for reproducing the dot pattern of the just previous divided region TL, i.e., if the dot pattern is reproduced by the pseudo gradation image dot pattern that is included in the thinned-out data ED, the calculation is performed regarding that the representative value of the divided region TL is "0". Therefore, in this case, the representative value of the noted region TL is the representative value difference itself. Note that concerning the divided region TL in which the number of unmatching dots is determined to be less than or equal to the thinning-out threshold value MH when the thinning-out process is performed, the dot pattern of the divided region TL is reproduced approximately with the representative value.

The above-mentioned process is performed for every divided region TL, so that the dot pattern of the whole pseudo gradation image data D1 is reproduced.

[Description with a Flowchart]

Next, a flow of the modeling process in the present example will be described with reference to the flowchart shown in FIG. 13.

Figure 13:
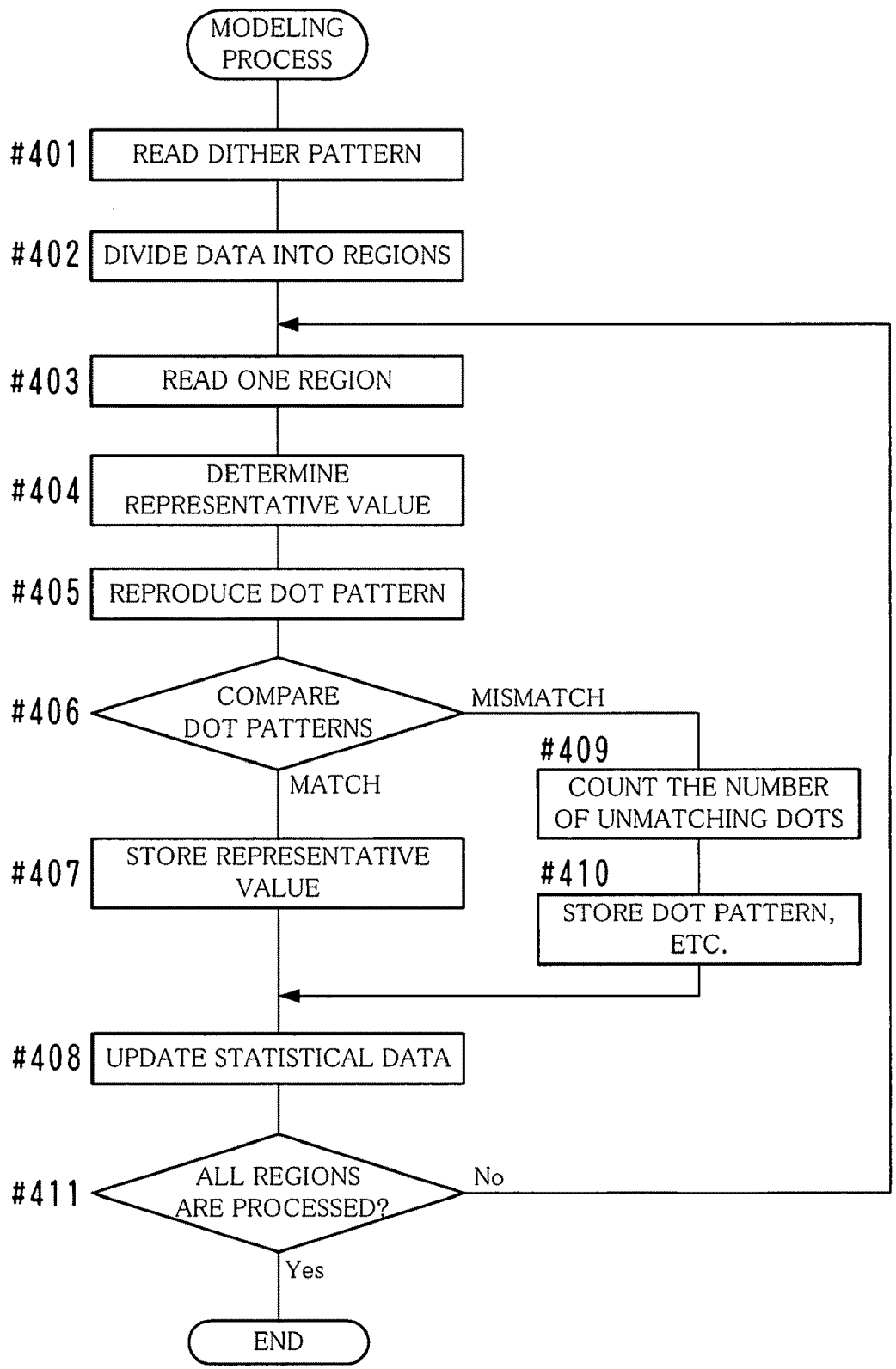
FIG. 13 is a flowchart for explaining a modeling process in the first example.

In FIG. 13, the dither pattern DP that was used for the pseudo gradation process when the pseudo gradation image data D1 to be compressed was generated is read first (#401). The pseudo gradation image data D1 to be compressed is divided into predetermined regions (#402). The divided region TL on which the modeling process is to be performed is read (#403). The number of dots of the read divided region TL is counted, and the counted number is determined to be the representative value of the divided region TL (#404). The dot pattern of the divided region TL is reproduced by using the determined representative value and the dither pattern DP read in the step #401 (#405).

The reproduced dot pattern is compared with the dot pattern of the pseudo gradation image data D1 of the divided region TL. If they match each other ("match" in #406), the representative value that was determined in the step #404 is stored as the modeled data MD of the divided region TL (#407). The statistical data TK is updated so that the number of divided regions TL in which the number of unmatching dots is "0" is increased by one (#408).

If the reproduced dot pattern does not match the dot pattern of the pseudo gradation image data D1 of the divided region TL ("mismatch" in #406), the number of unmatching dots is counted (#409). Furthermore, the representative value that was determined in the step #404, the number of unmatching dots that was determined in the step #407, the dot pattern of the pseudo gradation image data D1 in this divided region TL, and the switch flag are stored as the modeled data MD of this divided region TL (#410). The statistical data TK is updated so that the number of divided regions TL in which the number of unmatching dots is the number determined by counting in the step #409 is increased by one (#408).

If there is a divided region TL in which the modeling process is not performed yet ("No" in #411), the process of the step #403 and the subsequent steps is repeated with respect to the divided region TL.

If the modeling process is completed with respect to every divided region TL ("Yes" in #411), the modeling process is finished.

Next, the thinning-out threshold value deciding process in the present example will be described with reference to the flowchart shown in FIG. 14.

Figure 14:
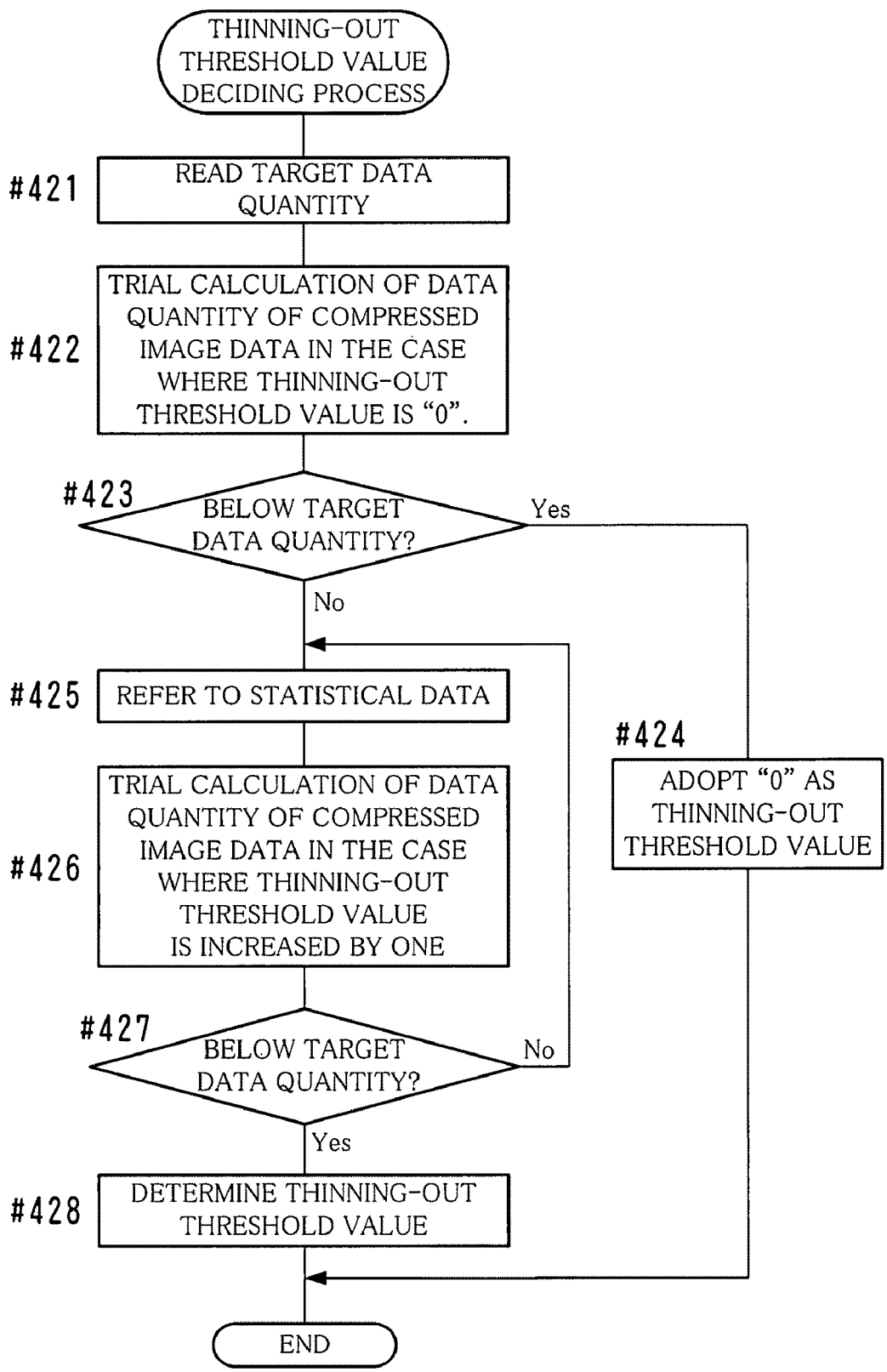
FIG. 14 is a flowchart for explaining a flow of a thinning-out threshold value deciding process in the first example.

In FIG. 14, the target data quantity GL is read (#421). The trial calculation of the data quantity of the sum of the compressed image data AD in the case where the thinning-out threshold value MH is regarded to be "0" is performed using the modeled data MD that was generated in the modeling process (#422).

If the data quantity obtained by the trial calculation is smaller than the target data quantity GL ("Yes" in #423), the thinning-out threshold value MH is determined to be "0" (#424).

If the data quantity obtained by the trial calculation is larger than or equal to the target data quantity GL ("No" in #423), the statistical data TK is referred to (#425), and the trial calculation of the compressed image data AD is performed in the case where the thinning-out threshold value MH is increased by one (#426).

If the data quantity obtained by the trial calculation is smaller than the target data quantity GL ("Yes" in #427), the thinning-out threshold value MH that was used for the trial calculation is determined to be the thinning-out threshold value MH that is to be used for the actual thinning-out process (#428).

If the data quantity obtained by the trial calculation performed in the step #426 is larger than or equal to the target data quantity GL ("No" in #427), the process of the step #425 and the subsequent steps is repeated.

Next, a flow of the thinning-out process in the present example will be described with reference to the flowchart shown in FIG. 15.

Figure 15:
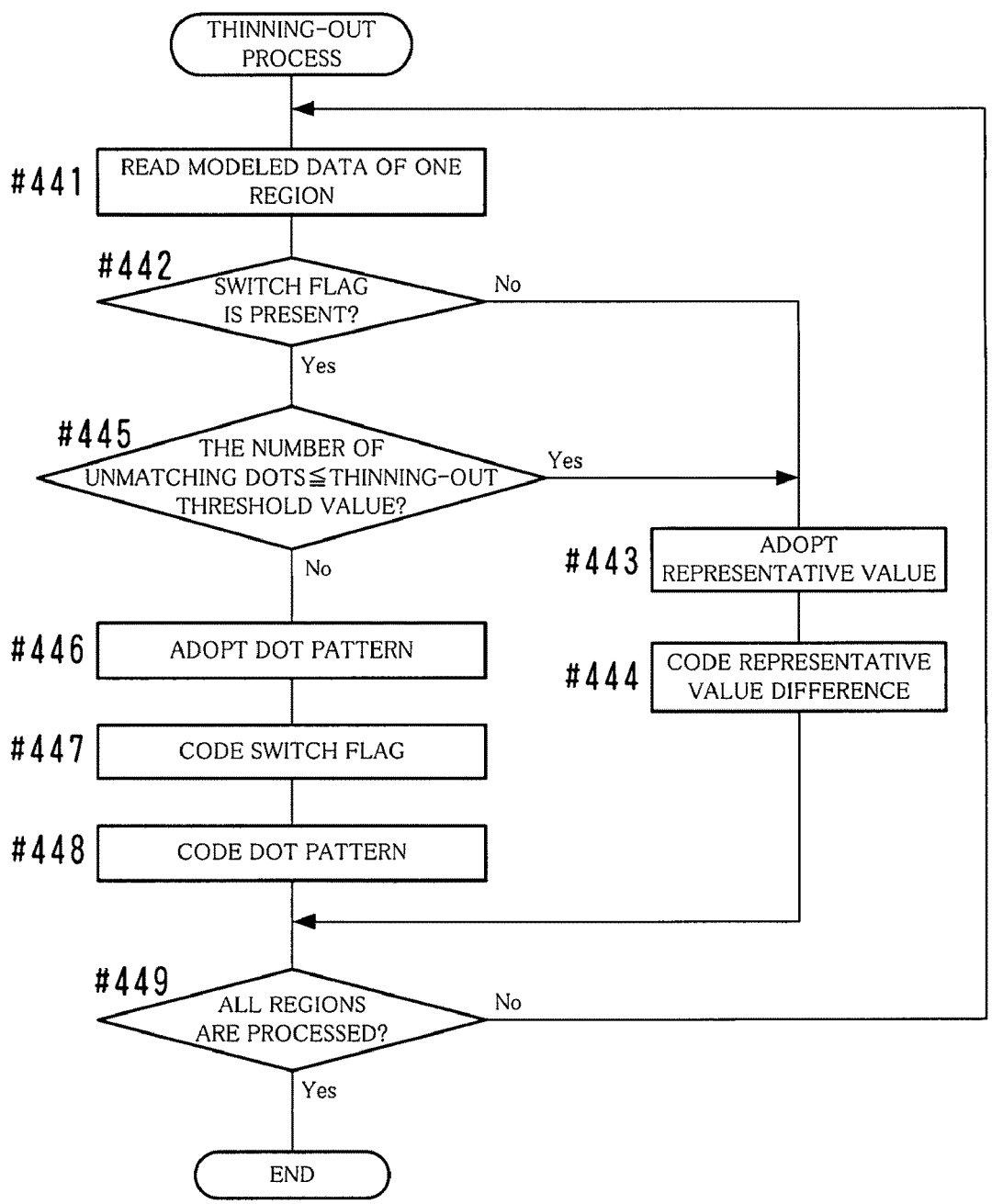
FIG. 15 is a flowchart for explaining a flow of the thinning-out process in the first example.

In FIG. 15, the modeled data MD of one region is read (#441). If the modeled data MD does not indicate the switch flag ("No" in #442), it is decided that the coding process is performed on the representative value shown in the modeled data MD (#443). Furthermore, a difference value between the representative value thereof and the representative value of the divided region TL that was processed just before is determined, and it is coded (#444).

If the modeled data MD indicates the switch flag in the step #441 ("Yes" in #442), the number of unmatching dots indicated in the modeled data MD is compared with the thinning-out threshold value MH (#445).

If the number of unmatching dots is smaller than or equal to the thinning-out threshold value MH ("Yes" in #445), the process of the step #443 and the subsequent steps is performed.

If the number of unmatching dots is larger than thinning-out threshold value MH ("No" in #445), it is decided that the coding process is performed on the dot pattern indicated in the modeled data MD (#446). The dot pattern and the switch flag are coded (#447 and #448).

If there is a divided region TL in which the thinning-out process is not performed yet ("No" in #449), the process of the step #441 and the subsequent steps is repeated with respect to the divided region TL.

If the thinning-out process is completed with respect to every divided region TL ("Yes" in #449), the process is finished.

The compressed image data AD generated in this way is transmitted from the computer main body 11 to the printer 13 and is expanded in the printer 13.

Figure 16:
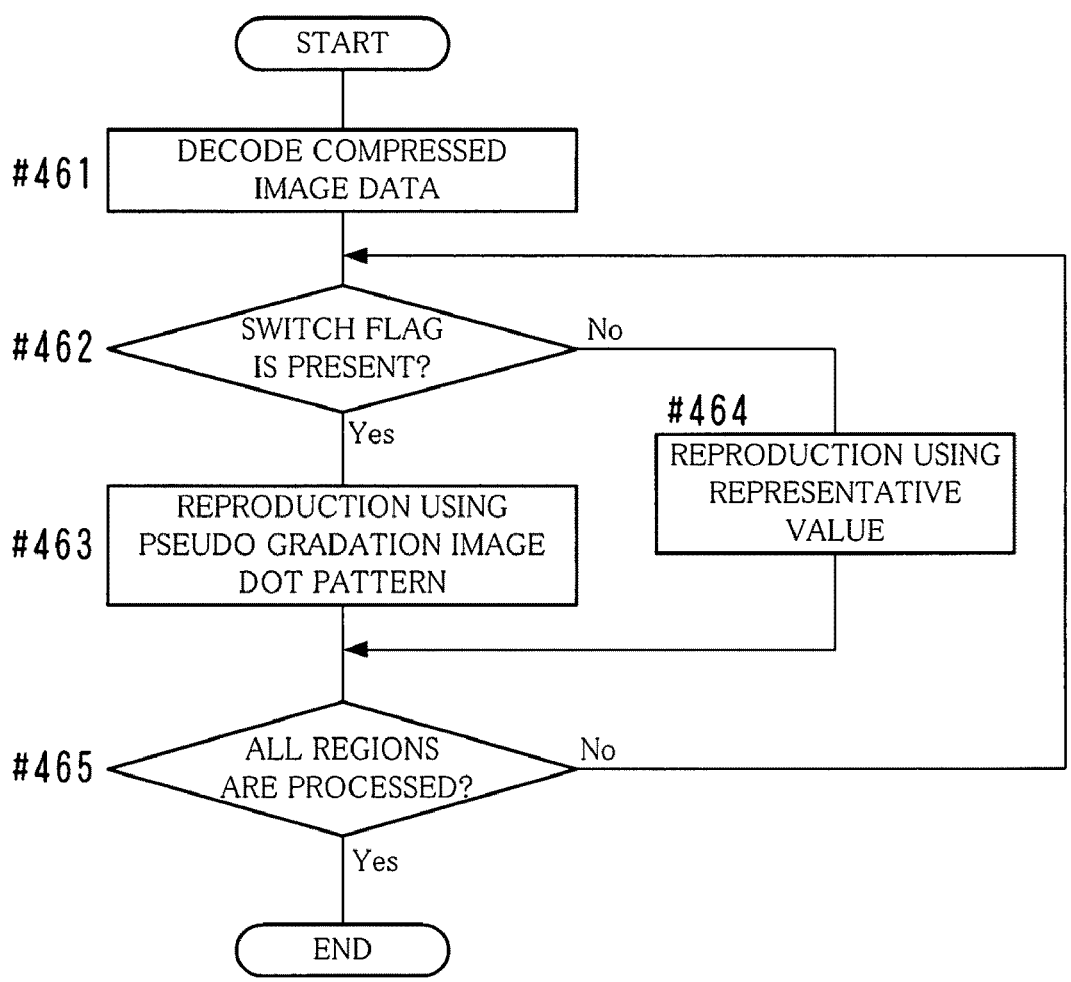
FIG. 16 is a flowchart for explaining a flow of an expansion process in the first example.

Next, a flow of the expansion process in the present example will be described with reference to the flowchart shown in FIG. 16.

In the expansion process, the compressed image data AD is decoded based on the code table FT1 first, so that the thinned-out data ED is reproduced (#461). With respect to the divided region TL in which the thinned-out data ED includes the switch flag ("Yes" in #462), the pseudo gradation image data D1 is reproduced by using the pseudo gradation dot pattern included in the thinned-out data ED (#463).

With respect to the divided region TL in which the thinned-out data ED does not include the switch flag ("No" in #462), the representative value is determined from the representative value deriving value included in the thinned-out data ED, and the pseudo gradation image data D1 is reproduced or approximately reproduced by using the representative value and the dither pattern DP (#464).

If the reproduction of the pseudo gradation image data D1 is not completed with respect to every divided region TL ("No" in #465), the process of the step #462 and the subsequent steps is repeated.

If the reproduction of the pseudo gradation image data D1 is completed with respect to every divided region TL ("Yes" in #465), the process is finished. After that, the printer 13 performs printing based on the reproduced or approximately reproduced pseudo gradation image data D1.

Figures 17A, 17B:
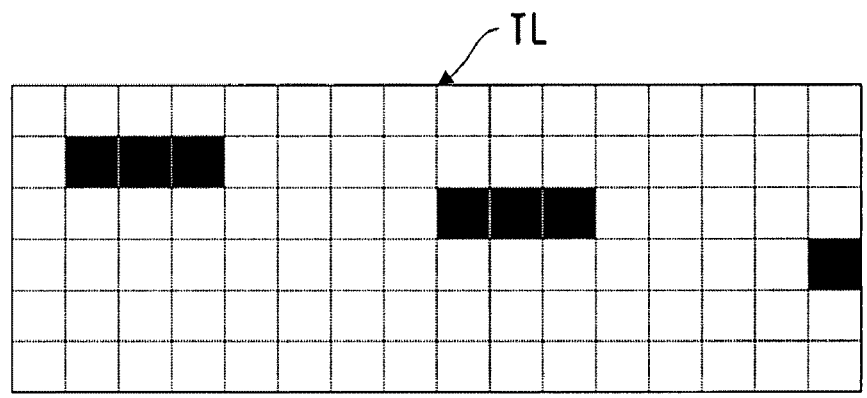
FIGS. 17A and 17B are diagrams showing an example of the divided region and the dither pattern.

Although the number of dots of the divided region TL is used as the representative value in the present example, it is possible to determine the representative value by using another method in accordance with the disclosure of U.S. application Ser. No. 11/318,046, filed on Dec. 23, 2005, which is incorporated by reference herein. More specifically, the representative value is determined as described below. Note that in this description, the divided region TL and the dither pattern DP that have 6×16 pixels as shown in FIGS. 17A and 17B are used.

Among the image data FD having gradation before the pseudo gradation process (the "binary process" in this example) is performed, image data FD of a region corresponding to the divided region TL is considered. Such image data FD is referred to as "image data FDL" here. Then, if a density value of each pixel of the image data FDL is less than the threshold value of the corresponding pixel of the dither pattern DP shown in FIG. 17B, it is regarded that the pixel is dotted. In other words, it is supposed that smaller density value means higher density here.

In this case, if a certain pixel is dotted, it can be said that a density value of the pixel is less than a threshold value of the corresponding pixel of the dither pattern DP. This can be said in other words that the upper limit value of density of the pixel is smaller than a threshold value of the corresponding pixel of the dither pattern DP by "1". On the contrary, if the pixel is not dotted, it can be said that a density value of the pixel is more than or equal to the threshold value of the corresponding pixel of the dither pattern DP. This can be said in other words that the lower limit value of density of the pixel is the threshold value of the corresponding pixel of the dither pattern DP.

Therefore, the upper limit value and the lower limit value of each pixel are summed up in the divided region TL and the dither pattern DP, so that a minimum value J of the upper limit value and a maximum value K of the lower limit value are determined. If the relationship (3) as shown below holds between the minimum value J of the upper limit value and the maximum value K of the lower limit value, there is a value of "a" that satisfies the relationship (4).

$$J \geq K \tag{3}$$

$$J \geq a \geq K \tag{4}$$

This value of "a" is determined to be the representative value. Note that if the expression (3) is not satisfied, i.e., if a value of the "a" is not determined, the representative value is determined in accordance with a predetermined rule. For example, the representative value of the just previous divided region TL is adopted as the representative value of the divided region TL.

Alternatively, it is possible to adopt a structure in which the representative value is determined by the method proposed in Japanese patent application No. 2005-204843. More specifically, the representative value is determined by the following methods.

In the case where the noted region TL is noticed, density value of each pixel in the noted region is determined by interpolation by using the representative value of the noted region TL and the representative value of one or more divided regions TL neighboring the noted region TL and in accordance with a predetermined interpolation rule, and further the pseudo gradation process is performed by using the dither pattern DP. In this case, a representative value such that the pseudo gradation image of the noted region TL can be reproduced is determined, and it is determined to be the representative value "a" of the noted region. If it is not reproduced, the representative value is determined in accordance with a predetermined rule. For example, the representative value of the just previous divided region TL is adopted as the representative value of the divided region TL.

The region neighboring the divided region TL in which the representative value "a" is decided is regarded as the next noted region TL, and the noted region TL is moved sequentially so that the representative value "a" is decided with respect to every region. Since the divided region TL that is the first noted region TL has no divided region TL in which the representative value "a" is already decided, the representative value "a" thereof should be decided considering a density value or the like of the pixel that is located at a periphery or an edge of the noted region TL, particularly at a vertex position.

Note that there are following interpolation rules that are used for determining the representative value "a", for example.

(1) A density value of each pixel is interpolated by a plane defined by total three representative values including a representative value of the noted region TL and two representative values of two regions neighboring the noted region TL. In addition, it may be straight line interpolation using other than the plane.

(2) A density value of each pixel is interpolated by a curved surface (twisted surface) defined by total four representative values including the representative value of the noted region TL and three representative values of three regions neighboring the noted region TL.

(3) A density value of each pixel is interpolated by a spline curved surface defined by the representative value of the noted region TL and the representative values of a plurality of regions neighboring the noted region TL. In addition, it may be polynomial interpolation instead of the spline interpolation.

SECOND EXAMPLE

In the present example, the case where the compressed image data AD is generated by performing orthogonal transformation on the density value of the image data FD having gradation with respect to each divided region TL will be described. As the orthogonal transformation, discrete cosine transformation (DCT), wavelet transformation or the like can be used. In the present example, the case where the discrete cosine transformation is performed will be described.

[Modeling Process]

Figure 18:
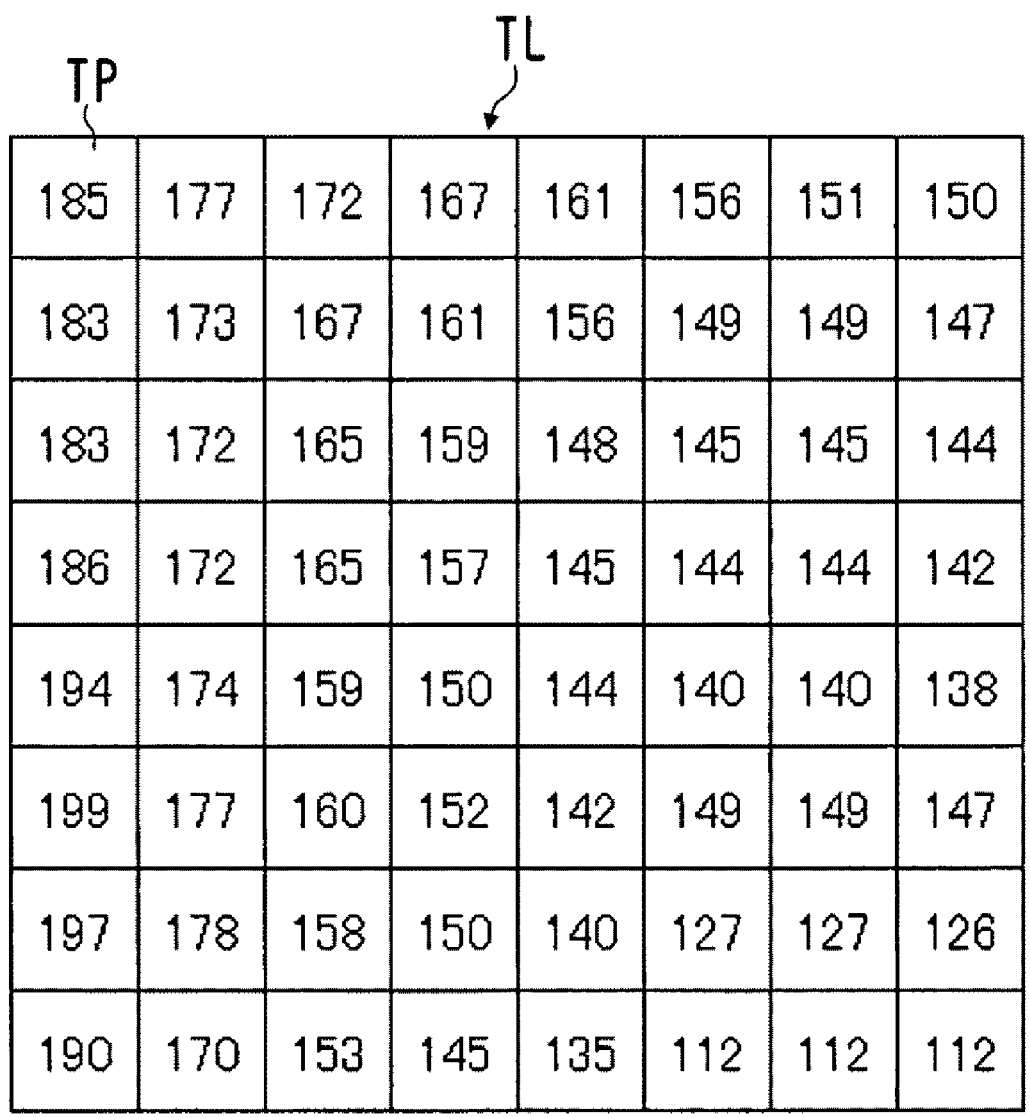
FIG. 18 is a diagram showing density values of pixels in the divided region in a second example.
Figure 19:
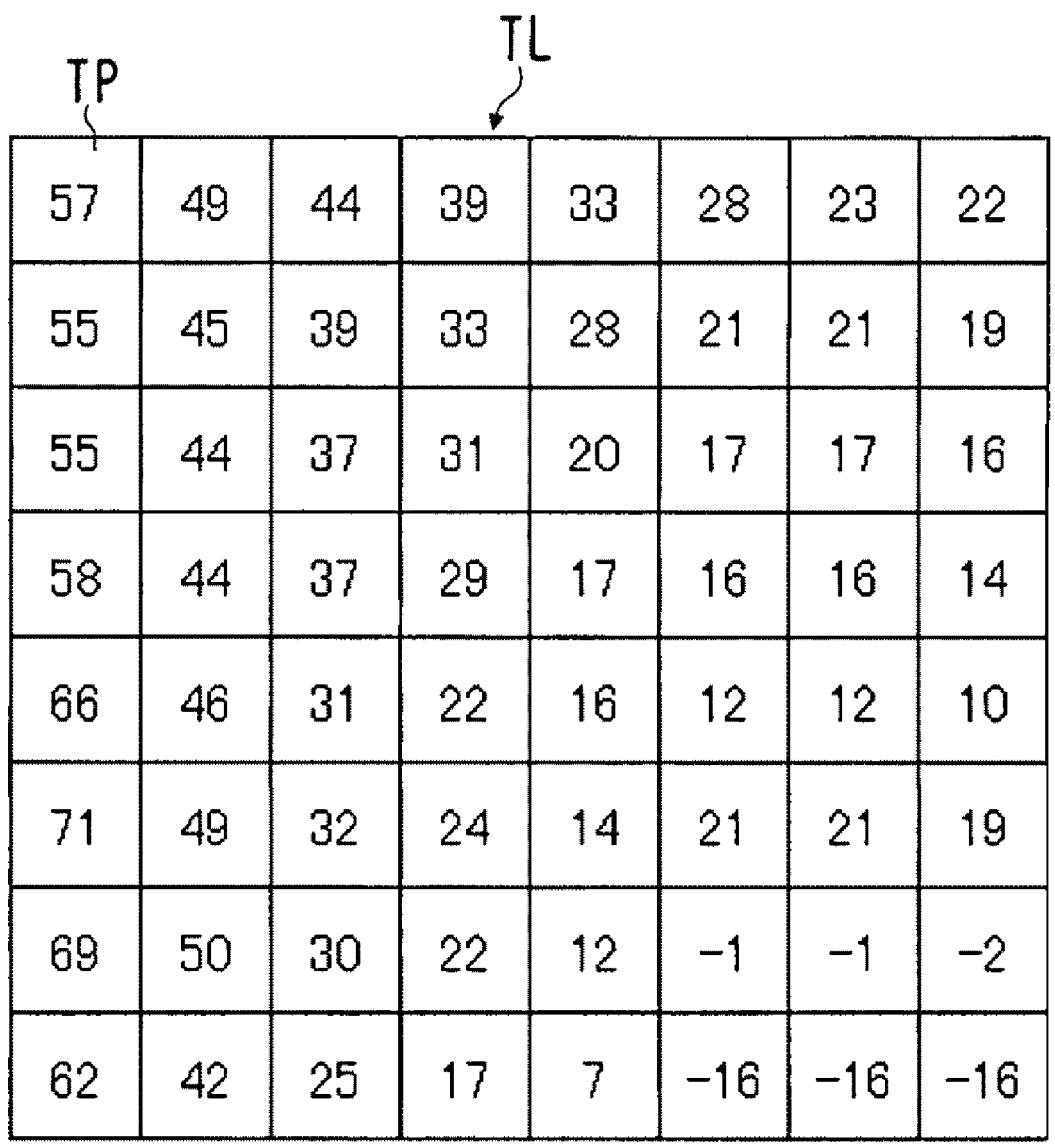
FIG. 19 is a diagram showing values of pixels in the divided region after a level shift.

FIG. 18 shows density values of the pixels TP of the divided region TL in the image data FD having 256 levels of gradation. In the modeling process of the present example, each of density values of pixels is shifted in level to the negative side by 128 bits. In other words, "128" is subtracted from the density value of each of the pixels. Thus, the density values are converted into the values shown in FIG. 19.

Next, the discrete cosine transformation is performed on each of the density values after the level shift, so as to convert it into a DCT coefficient indicating a frequency component. The DCT coefficient can be determined by calculating each density value after the level shift by using the following equation so that Gij in the left-hand side is calculated. In this equation, "i" and "y" represent numbers of rows, while "j" and "x" represent numbers of columns.

$$G_{ij} = \frac{1}{4} C_i C_j \sum_{x=0}^{7} \sum_{y=0}^{7} P_{xy} \cos\left\{\frac{(2y+1)j\pi}{16}\right\} \cos\left\{\frac{(2x+1)i\pi}{16}\right\} \tag{5}$$

$$Cf = \begin{cases} \frac{1}{\sqrt{2}}, & f = 0 \\ 1, & f = 0 \end{cases}$$

$$0 \leq i, \ j \leq 7$$

When the discrete cosine transformation is performed by using the above equation (5), the DCT coefficients as shown in FIG. 20 are obtained. These DCT coefficients have values within the range from "−1024" to "1023". Note that there is little deterioration in image quality at the stage of the discrete cosine transformation.

After the discrete cosine transformation, the determined DCT coefficient of each pixel is quantized. This quantization uses the quantization table RT as shown in FIG. 21. This quantization table RT may be one that is used for the JPEG compression, or it may be generated every time in accordance with the image data.

In FIG. 21, the quantization table RT is a table of 8×8 blocks indicating the quantization values corresponding to the DCT coefficients shown in FIG. 20 in the divided region TL, and each block indicates a quantization value for quantizing the DCT coefficient corresponding to each of them.

When the quantization is performed, the quantization value indicated in a block of the quantization table RT is used, and the DCT coefficient at the position corresponding to the block is divided by the quantization value so that the quantized coefficient RK is determined. For example, when the DCT coefficient "130" that is located at the second position from the left in the uppermost row (at the position of the row 0 and the column 1) in FIG. 20 is quantized, "130" is divided by "6" that is the quantization value corresponding to this position. This is also described by the following equation.

$$130/6 = 21.666$$

When the fraction is rounded off, the quantized coefficient RK becomes "22".

Figures 22A, 22B:
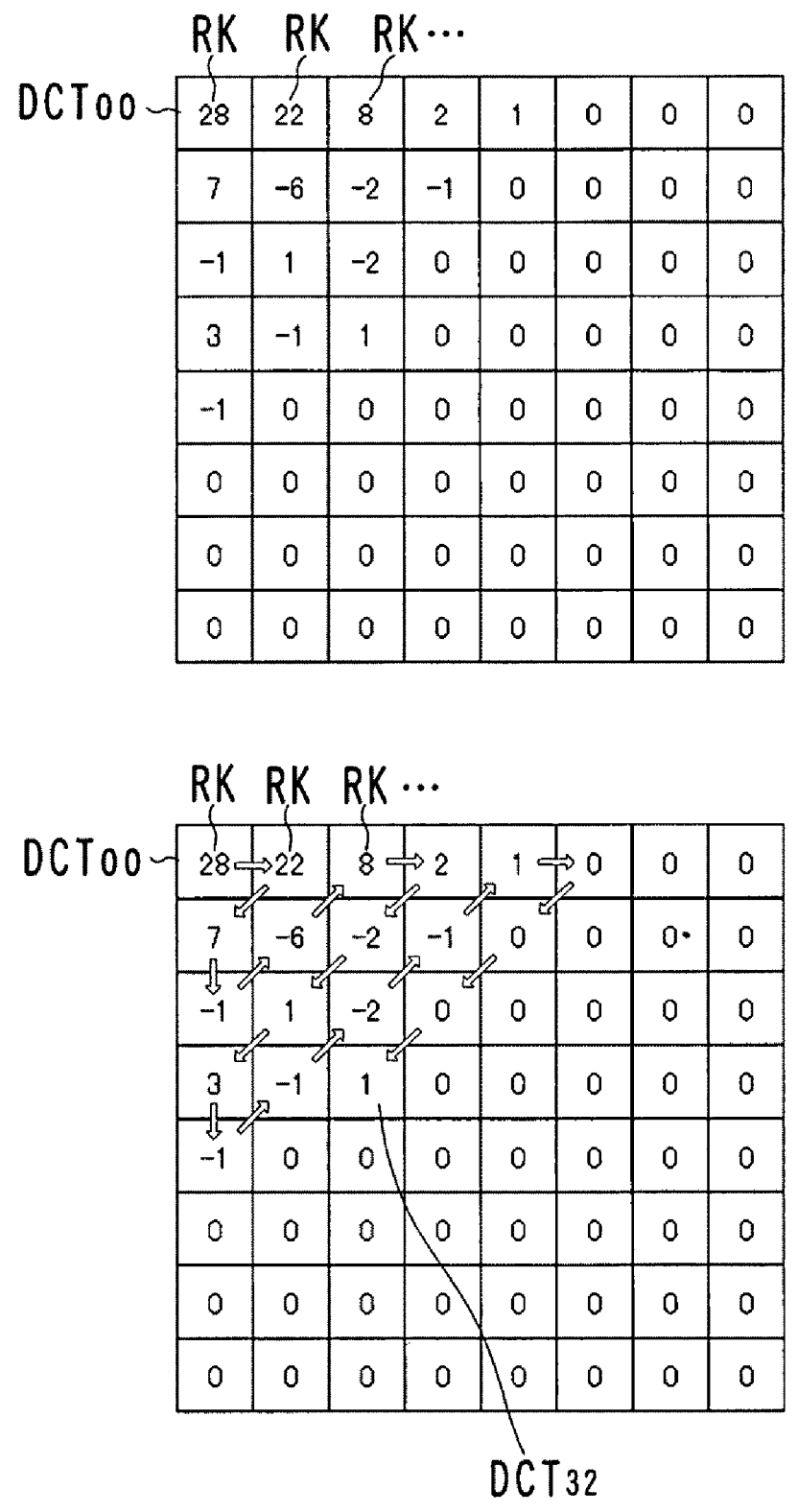

In this way, when every DCT coefficient in the divided region TL is quantized, the quantized coefficient RK as shown in FIG. 22A can be determined.

It is understood from FIGS. 22A and 22B that many DCT coefficients are changed to "0", and coefficients other than "0" gather in the upper left part.

When the quantized coefficient RK is determined, the modeled data MD is generated based on the quantized coefficient RK. In this case, as shown in FIG. 22B, the quantized coefficients RK are extracted from the $DCT_{00}$ at the row 0 and the column 0 sequentially in the zigzag pattern. Thus, data are extracted in the order of "28", "22", "7", "−1" and so on. When the discrete cosine transformation is performed, components having large values are apt to gather in the upper left part. Therefore, if the values are extracted from the upper left sequentially in the zigzag pattern in this way, a bias of the values becomes large so that data quantity can be reduced easily in the coding process.

Original information of the DCT coefficient is lost completely if it is converted into "0" by the quantization. This will be described in detail later in "Expansion process." Therefore, there is no need to remain the quantized coefficient RK that is converted into "0", so it can be removed at the stage of the modeling process. However, if the quantized coefficient RK other than "0" is extracted after "0", it is necessary to keep the relative position of the quantized coefficient RK, so it cannot be removed.

Therefore, quantized coefficients RK of "0" that follow the quantized coefficient RK except "0" that is extracted last are removed from the modeled data MD. In other words, quantized coefficients RK until the quantized coefficient RK except "0" that appears last are extracted and are used for generating the modeled data MD. In the example shown in FIG. 22B, 19 quantized coefficients RK until $DCT_{32}$ are extracted and are used for generating the modeled data MD.

In addition, when the quantized coefficients RK of "0" are removed, the number of quantized coefficients RK included in the modeled data MD varies depending on the divided region TL. Then, it is difficult to find a border between the modeled data MD of a certain divided region TL and the modeled data MD of the next divided region TL. In other words, it becomes difficult to find a relationship between the divided region TL and the modeled data MD. Therefore, in the present example, the number KS of the quantized coefficients RK included in the modeled data MD is added to the head of the modeled data MD.

When the modeling process is performed as described above, the modeled data MD as shown in FIG. 23 is generated with respect to one divided region TL. In this example, data quantity corresponding to 64 pixels is reduced to data quantity corresponding to 19 pixels.

[Thinning-Out Process]

Here, a process for thinning out quantized coefficients RK from the modeled data MD is performed, the quantized coefficients RK having smaller values than the thinning-out threshold value MH that is decided prior to the thinning-out process. More specifically, the quantized coefficient RK included in the modeled data MD is divided by the thinning-out threshold value MH, and as a result quantized coefficients RK whose values become "0", i.e., quantized coefficients RK whose information are lost completely are thinned out. Hereinafter, a coefficient that is obtained by dividing the quantized coefficient RK by the thinning-out threshold value MH may be referred to as a "thinned-out coefficient MK".

For example, if the thinning-out threshold value MH is "2", each of the quantized coefficients RK indicated in the modeled data MD shown in FIG. 23 is divided by "2", so that each of them is converted into the thinned-out coefficient MK shown in FIG. 24A.

Here, the thinned-out coefficient MK obtained by dividing the quantized coefficient RK by the thinning-out threshold value MH is rounded off to an integer in the same manner as the case of the quantization. However, if the value is less than "1", the fraction is rounded down. In other words, it is converted to "0".

The thinned-out coefficient MK that is converted to "0" does not need to be kept because the original information is lost completely. Therefore, in the same manner as the case of the modeling process, "0" succeeding the value except the last "0" is omitted. Thus, in the modeled data MD of the noted region TL, following and continuing quantized coefficients RK having an absolute value smaller than the thinning-out threshold value MH are omitted. Therefore, if the thinning-out threshold value MH is "2", in the example of FIG. 23, the quantized coefficient RK14 to the quantized coefficient RK19 are objects to be omitted.

After the thinned-out coefficients MK are removed, the number KS indicated in the head of the modeled data MD is updated with the number of remaining thinned-out coefficient MK. Thus, the modeled data MD shown in FIG. 23 is converted into the thinned-out data ED as shown in FIG. 24B. In this example, the data quantity is reduced to that corresponding to 19 pixels by the modeling process and is further reduced to that corresponding to 14 pixels.

[Coding Process]

In the coding process, the thinned-out coefficients indicated in the thinned-out data ED are coded by using the coding table FT2 shown in FIG. 25.

In FIG. 25, the code table FT2 includes items of the "thinned-out coefficient", the "code" and the "number of additional bits." The "thinned-out coefficient" indicates one or more thinned-out coefficients to be coded. The "code" indicates the first half of the code that is assigned to the thinned-out coefficient on the corresponding row. The "number of additional bits" indicates the number of bits of the second half of the code that is assigned to the thinned-out coefficient on the corresponding row. A concrete method of the coding process by the code table FT2 is the same as the method that was described for the code table FT1 shown in FIG. 9.

Among the DCT coefficients shown in FIG. 20 obtained by the discrete cosine transformation, the value indicated at the position of the $DCT_{00}$ ("224" in the example of FIG. 20) is particularly called a "DC component." This is a component showing an average of density values of the divided region TL. In addition, a value other than that is particularly called an "AC component" in contrast with the DC component.

The average of density values of the divided region TL varies slowly between neighboring divided regions TL in many cases. Therefore, the difference value of the DC component between neighboring divided regions TL often becomes a small value. Since a smaller value is assigned with a code having a shorter code length according to the code table FT2, data quantity of the DC component can be reduced by coding the difference value. Since the AC component has little relationship between divided regions TL, it is coded independently for each divided region TL.

[Thinning-Out Threshold Value Deciding Process]

In the thinning-out threshold value deciding process, trial calculation of data quantity of the compressed image data AD is determined by determining data quantity in the case where the modeled data MD is coded based on the code table FT2 shown in FIG. 25 and by further determining data quantity that is reduced by the thinning-out process and the coding process, and the thinning-out threshold value MH is decided based on the result.

When the data quantity in the case where the modeled data MD is coded is determined, the quantized coefficient RK included in the modeled data MD is scanned, and it is checked which raw of the code table FT2 the scanned quantized coefficient RK corresponds to. When the corresponding row is found, the code length in the case where the quantized coefficient RK is coded can be known easily. Furthermore, the quantized coefficient RK is scanned in turn, and the obtained code length is added.

This simple process is performed for the modeled data MD of every divided region TL, so that a total sum of code lengths of all the quantized coefficients RK, i.e., data quantity in the case where modeled data MD is coded by the code table FT2 as it is can be determined. The data quantity that is determined as described above is referred to as "A" here.

Concerning the thinning-out process, in the modeled data MD of the noted region TL, following and continuing quantized coefficients RK that are smaller than the thinning-out threshold value MH are omitted. Hereinafter, such a quantized coefficient RK may be referred to as a thinning-out target coefficient RK in particular.

The number of thinning-out target coefficients RK can be counted by comparing the quantized coefficients RK included in the modeled data MD of the noted region TL with the thinning-out threshold value MH from the head sequentially. More specifically, the comparison is performed sequentially, and the number is counted up when a quantized coefficient RK that is smaller than the thinning-out threshold value MH appears. If the quantized coefficient RK that is equal to or larger than the thinning-out threshold value MH appears, the count value is reset to zero. This process is repeated until the last quantized coefficient RK included in the modeled data MD of the noted region TL. A count value that is obtained finally is the number of thinning-out target coefficients RK of the noted region TL.

By performing such a simple process for every divided region TL, the total number of thinning-out target coefficients RK is obtained with respect to every divided region. The thinning-out target coefficient RK is divided by the thinning-out threshold value MH to have the value of "0." Therefore, if the thinning-out target coefficient RK is coded, the code length becomes 2 bits based on the code table FT2. Therefore, when all the thinning-out target coefficients RK are omitted, data quantity of "the total number of thinning-out target coefficients RK×2" can be reduced. The data quantity to be reduced by the thinning-out process that is determined as described above is referred to as "B" here.

In the present example, powers of 2 (1, 2, 4, 8 and so on) are used as the thinning-out threshold value MH. Therefore, when the thinning-out threshold value MH is increased by one step, the quantized coefficient RK is converted into the thinned-out coefficient MK having a ½ value by the thinning-out process. This means that the row corresponding to the quantized coefficient RK goes upward by one row in the code table FT2. The code length is decreased by one bit as the row goes upward in the code table FT2. Therefore, increasing the thinning-out threshold value MH by one step means that the code length decreases by one bit per one quantized coefficient RK.

In other words, since the code length of each quantized coefficient RK decreases by one bit when the thinning-out threshold value MH increases by one step in the coding process, data quantity is reduced corresponding to the number of quantized coefficients RK to be coded. The data quantity to be reduced by the coding process that is determined as described above is referred to as "C" here.

As described above, the data quantity A in the case where the modeled data MD is coded as it is, the data quantity B that is reduced by the thinning-out process, and the data quantity C that is reduced by the coding process can be determined. Then, these are assigned to the following equation so that trial calculation of the data quantity of the compressed image data AD can be performed.

$$A-(B+C) \qquad (6)$$

Then, a thinning-out threshold value MH that makes the data quantity of the compressed image data AD obtained by the trial calculation be smaller than the target data quantity GL is determined, and it is determined to be the thinning-out threshold value MH that is used for the actual thinning-out process.

[Expansion Process]

In the expansion process, the compressed image data AD is decoded first based on the code table FT2. Next, the DCT coefficient is reproduced by using the thinning-out threshold value MH and the quantization table RT. More specifically, the products of the decoded coefficients and the thinning-out threshold value MH are calculated, and further the products of the obtained values and the quantization value indicated in the quantization table RT are calculated.

Here, it is possible to adopt a structure in which the quantization values indicated in the quantization table RT are multiplied by the thinning-out threshold value MH to generate a quantization table RT' so that the DCT coefficient is reproduced by using the quantization table RT'. Note that concerning the coefficients that are rounded in the quantization or the thinning-out process, the DCT coefficient is reproduced approximately. Hereinafter, the process for reproducing the DCT coefficient may be referred to as "inverse quantization."

Furthermore, the reproduced DCT coefficients are processed with the inverse discrete cosine transformation, and each value obtained by the transformation is shifted to the positive side (inverse level shift) by 128 bits, so that each density value is reproduced approximately.

Note that the thinning-out threshold values MH are transmitted to the printer 13 together with the compressed image data AD. In addition, the quantization table RT that is used for the expansion process may be stored in the printer 13 in advance or may be transmitted from the computer main body 11 together with the compressed image data AD.

[Description with Reference to Flowchart]

Next, with reference to the flowchart shown in FIG. 26, the compression and the expansion processes in the present example will be described.

Figure 26:
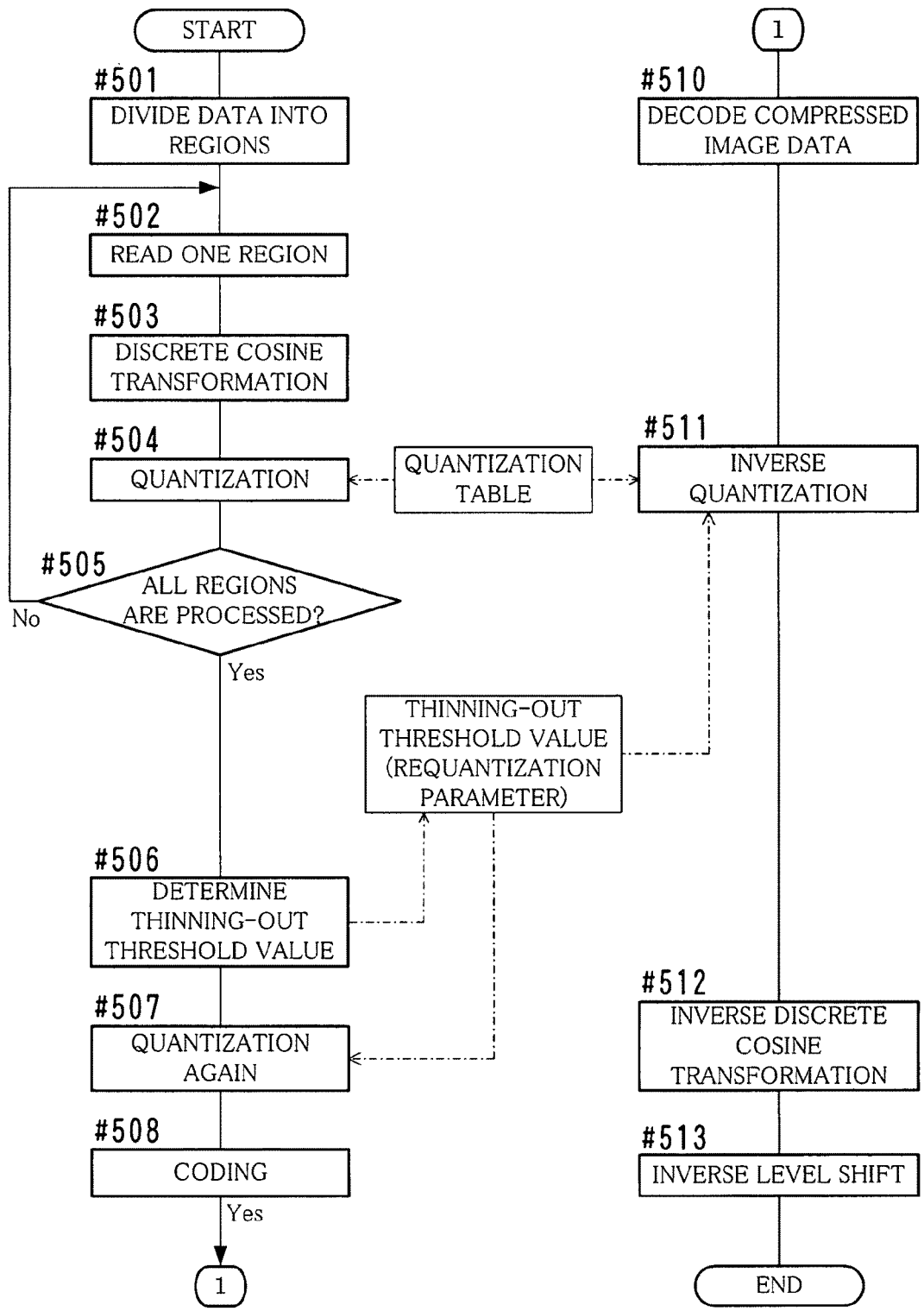
FIG. 26 is a flowchart for explaining a flow of a process concerning compression and expansion in the second example.

First in FIG. 26, the compressed image data FD is divided into predetermined regions (#501). A divided region TL on which the modeling process is to be performed is read (#502). The discrete cosine transformation is performed in the read divided region TL (#503). DCT coefficients obtained by the transformation in the step #503 are quantized (#504).

If the process until the step #504 is not finished yet with respect to every divided region TL ("No" in #505), the process of the step #502 and the subsequent steps is repeated.

If the process until the step #504 is finished with respect to every divided region TL ("Yes" in #505), the thinning-out threshold value MH is decided based on the modeled data MD (#506).

Each value that was quantized in the step #504 is divided by the decided thinning-out threshold value MH (#507). Each value obtained by the division is coded (#508). The compressed image data AD is generated by the process described above in the computer main body 11.

The generated compressed image data AD is transmitted from the computer main body 11 to the printer 13, and it is expanded in the printer 13. In the expansion process, the compressed image data AD is first decoded based on the code table FT2 (#510).

The decoded values are multiplied by the quantization table and the thinning-out threshold value MH as the inverse quantization (#511). The values obtained by the inverse quantization are processed with the inverse discrete cosine transformation (#512). The values obtained by the transformation are processed with the inverse level shift (#513). By the process described above, the image data is reproduced approximately.

THE THIRD EXAMPLE

In the present example, the case where the compressed image data AD is generated by performing the Block Truncation Coding (BTC) process on each divided region TL of the image data FD having gradation will be described.

[Modeling Process]

FIG. 27A shows a gradation image of the divided region TL. First in the modeling process, a region average that is an average of density values of the divided region TL is determined. Pixels having density values that are thicker than the determined region average (high density pixels) are discriminated from pixels having density values that are thinner that the same (low density pixels), and a first average that is an average of density values of thick pixels and a second average that is an average of density values of thin pixels are determined (see FIG. 27B). Furthermore, as shown in FIG. 27C, a virtual dot pattern that is a dot pattern in the case where pixels having density values thicker than the region average are dotted is obtained.

The above process is performed with respect to every divided region TL, and the modeled data MD including the first average, the second average and the virtual dot pattern is generated for each divided region TL.

Since the first average and the second average are averages of density values, they are expressed with 8 bits in the case where the image data FD has 256 levels of gradation. In addition, concerning the virtual dot pattern, since one pixel dot is expressed with one bit, one divided region TL that is a region including 64 pixels (8×8 pixels) can be expressed with 64 bits. Therefore, the data quantity of the modeled data MD in this case becomes 80 bits (64+8+8 bits). Therefore, in this modeling process, the data quantity of 64 pixels×8 bits is reduced to 80 bits.

[Thinning-Out Process]

In the thinning-out process, a process of reducing data quantity is performed in which density values of the divided region TL having a small difference between the first average and the second average is regarded uniformly as the first average.

When such a process is performed, in the case where the noted region TL is noticed, a difference between the first average and the second average indicated in the modeled data MD of the noted region TL is determined first. Then, if the difference is less than or equal to the thinning-out threshold value MH that was decided prior to the thinning-out process, the thinned-out data ED of the noted region TL is generated by using the first average. This means that the first average and the second average that are two average values of the divided region TL are integrated into one value. Note that it is possible to use other value such as the second average or the intermediate value between the first average and the second average for generating the thinned-out data ED in this case.

If the difference is larger than the thinning-out threshold value MH, the thinned-out data ED is generated by using the first average, the second average, the virtual dot pattern and the switch flag indicated in the modeled data MD.

Therefore, with respect to the divided region TL in which the difference between the first average and the second average is small, i.e., the difference is smaller than or equal to the threshold value, the thinned-out data ED of 8 bits (1 byte) is generated from the modeled data MD of 80 bits (10 bytes). In other words, in such a divided region TL, the data is compressed by $\frac{1}{10}$.

[Coding Process]

In the coding process, the first average deriving value for determining the first average, the second average deriving value for determining the second average and the virtual dot pattern included in the thinned-out data ED are coded.

Here, as the first average deriving value of the noted region TL that is noticed, a difference between the first average of its just previous divided region TL and the first average of the noted region TL is used. In addition, as the second average deriving value, a difference between the second average of its just previous divided region TL and the second average of the noted region TL is used. If the second average is not included in the thinned-out data ED of the just previous divided region TL, a difference between the first average of its just previous divided region TL and the second average of the noted region TL is coded. The code table FT3 shown in FIG. 28 is used for this coding process.

In FIG. 28, the code table FT3 includes items of the "average difference", the "code" and the "number of additional bits." The "average difference" indicates one or more values of differences between averages to be coded. The "code" indicates the first half of the code that is assigned to the difference of the corresponding row. The "number of additional bits" indicates the number of bits of the second half of the code that is assigned to the difference indicated in the corresponding row. A concrete method of the coding process with the code table FT3 is similar to the one described for the code table FT1 shown in FIG. 9.

In addition, the coding process is performed by the run-length coding method with respect to the virtual dot pattern. The code length changes mainly in the binary data by integrating the first average and the second average into one value, and changes in the gradation part of 256 levels can be neglected.

[Thinning-Out Threshold Value Deciding Process]

Here, trial calculation of data quantity of the thinned-out data ED is performed so as to decide the thinning-out threshold value MH whose data quantity is less than or equal to the target data quantity GL. In the thinning-out process, as described above, the modeled data MD of 80 bits is compressed to the thinned-out data ED of 8 bits with respect to the divided region TL in which the difference between the first average and the second average is smaller than the thinning-out threshold value MH.

Therefore, data quantity that is reduced in the thinning-out process can be determined easily by the following expression.

(the number of divided region TL in which the difference is less than or equal to the thinning-out threshold value MH)×72 bits (7)

This "the number of divided region TL in which the difference is less than or equal to the thinning-out threshold value MH" can be determined by generating statistical data in advance that indicates the number of divided regions TL with respect to the difference. Such statistical data is generated in the modeling process, for example.

The trial calculation of data quantity of the thinned-out data ED can be performed by subtracting the data quantity that is reduced in the thinning-out process from data quantity of all the divided regions TL in the case where the thinning-out process is not performed.

Note that the data quantity in the case where the thinning-out process is not performed can be determined by the following expression because data quantity of the modeled data MD of one divided region TL is 80 bits.

(the total number of divided regions TL)×80 bits (8)

Then, a difference such that data quantity of the thinned-out data ED obtained by the trial calculation becomes less than the target data quantity GL is determined, and the difference is determined to be the thinning-out threshold value MH.

Furthermore, in the present example too, the thinning-out threshold value MH can be determined by using the graph shown in FIGS. 12A and 12B described in the "first example."

[Expansion Process]

In the expansion process, the generated compressed image data AD is decoded first by using the code table FT3. The thinned-out data ED obtained by decoding is read sequentially for each divided region TL, so that the image data FD is reproduced.

With respect to the divided region TL in which the switch flag is not indicated by the read thinned-out data ED, the image data of the divided region TL is reproduced by using the first average included in the thinned-out data ED. In other words, it is reproduced approximately regarding that density values in the divided region TL are uniformly the first average.

With respect to the divided region TL in which the switch flag is indicated by the read thinned-out data ED, the image data of the divided region TL is reproduced by using the first average, the second average and the virtual dot pattern included in the thinned-out data ED. In other words, the image data FD of the divided region TL is reproduced approximately regarding that density values of the dotted pixels of the virtual dot pattern are uniformly the first average while density values of undotted pixels are uniformly the second average. This process is performed with respect to every divided region TL, and the entire image data FD is reproduced approximately.

[Description with a Flowchart]

Next, the compression and the expansion processes in the present example will be described with reference to the flowcharts shown in FIGS. 29 and 30.

Figure 29:
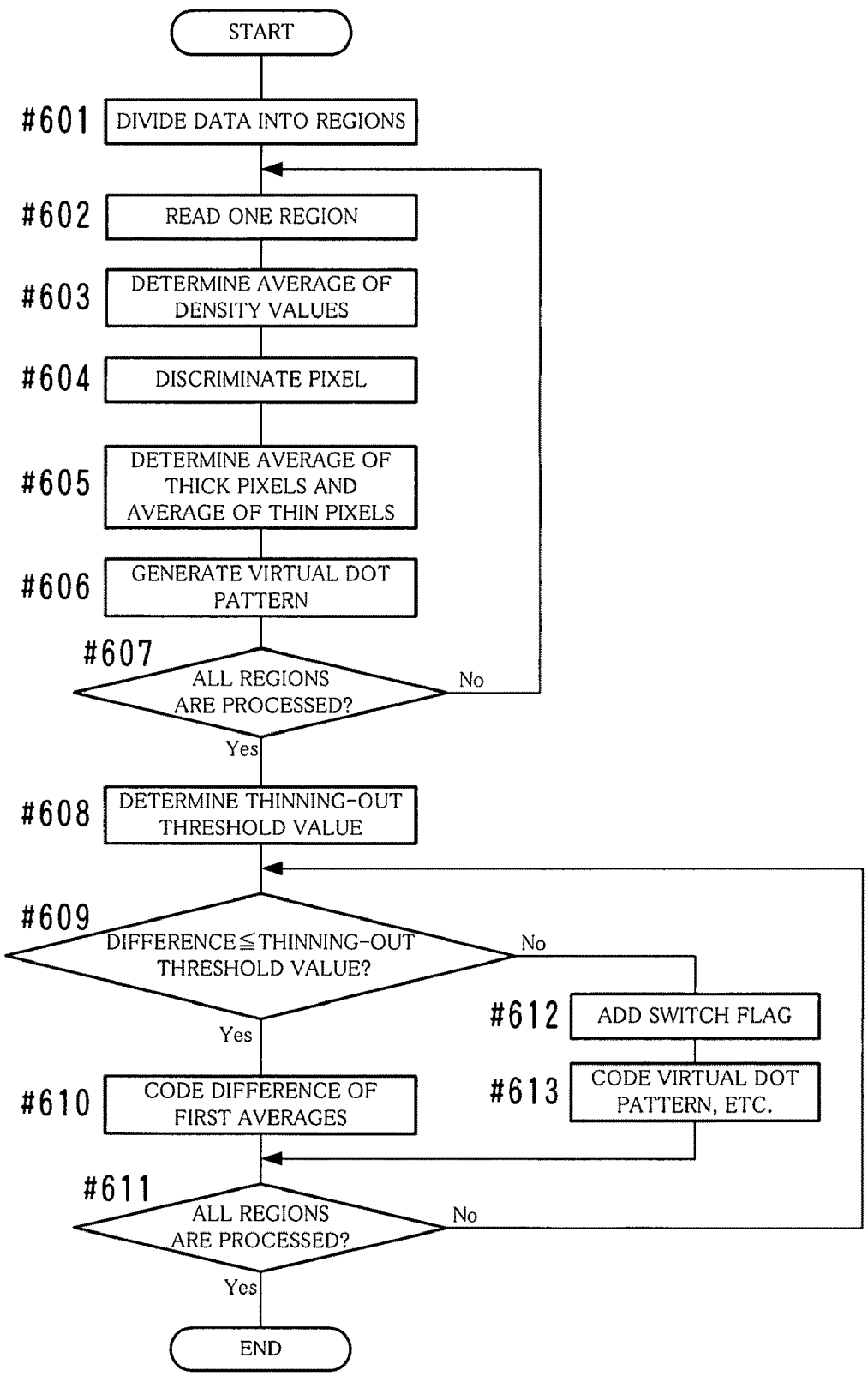
FIG. 29 is a flowchart for explaining a flow of compression process in the third example.

First in FIG. 29, the image data FD to be compressed is divided into predetermined regions (#601). The image data FD with respect to the divided region TL on which the modeling process is to be performed is read (#602). An average of density values of pixels of the divided region TL that is read is determined (#603). Pixels having density values larger than the average determined in the step #603 are discriminated from pixels having density values smaller than the same (#604). A first average that is an average of density values of the pixels having the larger density values and a second average that is an average of density values of the pixels having the smaller density value are determined (#605). A virtual dot pattern that is a dot pattern in the case where the pixels having larger density values are dotted is determined (#606), and modeled data MD including the first average, the second average and the virtual dot pattern is generated.

If the process until the step #606 is not completed yet with respect to every divided region TL ("No" in #607), the process of the step #602 and the subsequent steps are repeated.

If the process until the step #606 is completed with respect to every divided region TL ("Yes" in #607), the thinning-out threshold value MH is determined based on the modeled data MD (#608).

In the thinning-out process, the modeled data MD with respect to the divided region TL on which the thinning-out process is to be performed is read, and a difference between the first average and the second average indicated in the modeled data MD is compared with the thinning-out threshold value MH that was decided in the step #608 (#609).

If the difference is less than or equal to the thinning-out threshold value MH ("Yes" in #609), the compressed image data AD is generated by coding the first average deriving value for determining the first average (#610).

If the difference between the first average and the second average is larger than the thinning-out threshold value MH ("No" in #609), a switch flag is added (#612), and the compressed image data AD is generated by coding the switch flag, the virtual dot pattern, the first average deriving value, the second average deriving value for determining the second average (#613).

If the generation of the compressed image data AD is not completed yet with respect to every divided region TL ("No" in #611), the process of the step #609 and the subsequent steps is repeated.

If the generation of the compressed image data AD is completed with respect to every divided region TL ("Yes" in #611), the compression process is finished.

In this way, the compressed image data AD is generated and is transmitted from the computer main body 11 to the printer 13.

Figure 30:
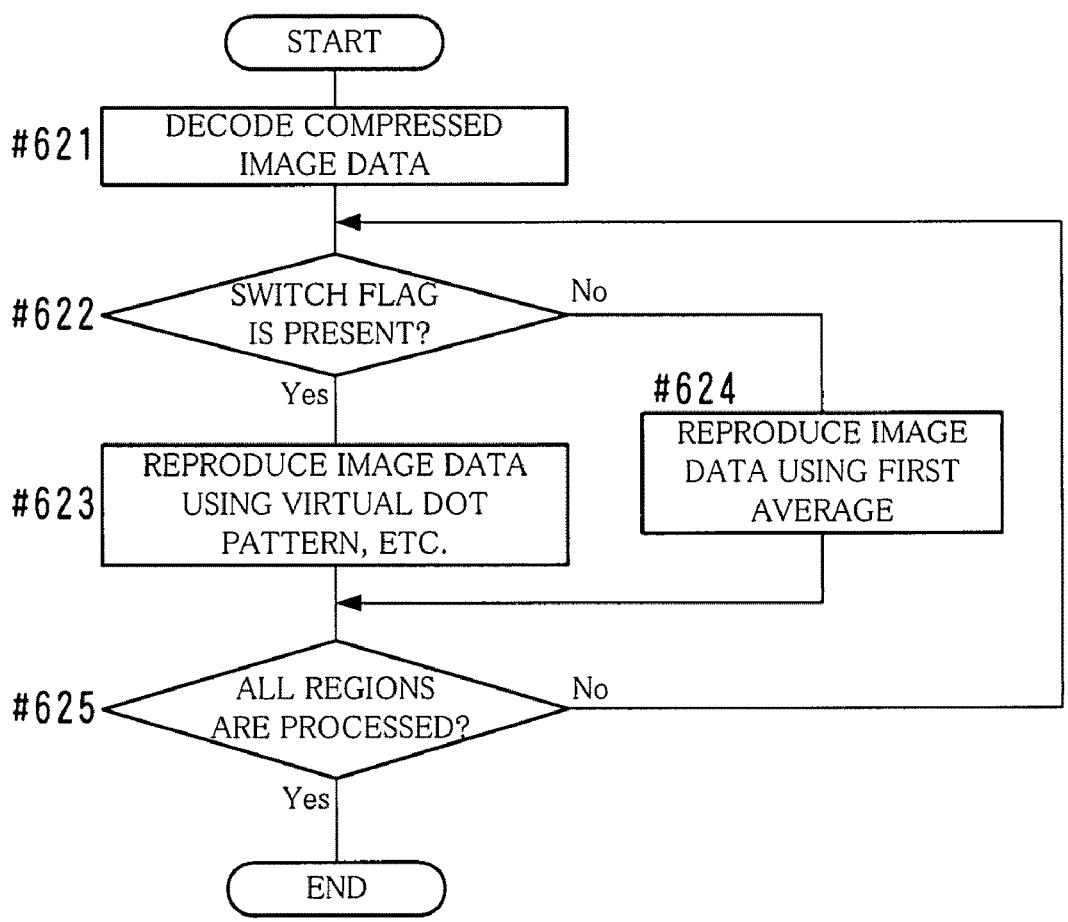
FIG. 30 is a flowchart for explaining a flow of an expansion process in the third example.

First in the expansion process, the compressed image data AD is decoded based on the code table FT3, so that the thinned-out data ED is reproduced (#621 in FIG. 30). With respect to the divided region TL in which the switch flag is included in the thinned-out data ED ("Yes" in #622), the image data FD of the divided region TL is reproduced approximately based on the first average that can be determined from the first average deriving value included in the thinned-out data ED, the second average that can be determined from the second average deriving value and the virtual dot pattern (#623).

In other words, in the virtual dot pattern, regarding that density values of the dotted pixels are uniformly the first average while density values of the undotted pixels are uniformly the second average, its density value is determined approximately.

With respect to the divided region TL in which the switch flag is not included in the thinned-out data ED ("No" in #622), the image data FD of the divided region TL is reproduced approximately based on the first average included in the thinned-out data ED (#624). In other words, regarding that density values of pixels in the divided region TL are uniformly the first average, the density value is determined approximately.

If the reproduction of the image data FD is not completed yet with respect to every divided region TL ("No" in #625), the process of the step #622 and the subsequent steps is repeated.

If the reproduction of the image data FD is completed with respect to every divided region TL ("Yes" in #625), the process is finished. After that, the printer 13 performs printing based on the approximately-reproduced image data FD.

Although the first average corresponds to pixels having density values larger than the region average while the second average corresponds to pixels having density values smaller than the same in the present example, it is possible to adopt the opposite relationship.

In addition, the example described above uses the first average and the second average as values to be included in the modeled data MD as they are. This may be other value for determining the first average and the second average. For example, instead of the first average, a difference between the first average and the first average of the just previous divided region TL may be included. Instead of the second average, a difference between the first average and the second average may be included.

In addition, various values can be used as the first average deriving value and the second average deriving value. For example, the following may be adopted.

(1) As the first average deriving value, the first average may be used.

(2) As the first average deriving value of the noted region TL, a difference between the first average of the just previous divided region TL of the noted region TL and the first average of the noted region TL may be used.

(3) As the second average deriving value, the second average may be used.

(4) As the second average deriving value, a difference between the first average and the second average may be used.

(5) As the second average deriving value of the noted region TL, a difference between the second average of the just previous divided region TL of the noted region TL and the second average of the noted region TL.

According to the present embodiment, data quantity is reduced from ½ to 1/10 approximately in the modeling process, and it is reduced from 1/10 to 1/200 approximately in the thinning-out process. The data quantity that is reduced in the thinning-out process is adjusted with the thinning-out threshold value MH. Then, the image data FD to be compressed is compressed so that its data quantity becomes less than the target data quantity GL and close to the same. Thus, the best image quality can be secured in the case where data quantity after the compression becomes less than the target data quantity GL, so that compression performance can be maintained.

According to the present embodiment, trial calculation of the data quantity is performed based on the modeled data MD, so that the thinning-out threshold value MH can be determined. In addition, the compressed image data AD to be produced finally is generated via the modeled data MD and the thinned-out data ED. Therefore, only keeping the modeled data MD can realize the compression process that controls the data quantity within the target data quantity GL without having an additional memory area that is necessary in the conventional structure. Furthermore in many cases, data quantity of the modeled data MD becomes much smaller than the image data FD or the pseudo gradation image data D1. For this reason, the memory area that is necessary for the compression process can be reduced largely compared with the conventional structure.

Furthermore, in the process in which the compressed image data AD is generated via the modeling process and the thinning-out process, the data quantity to be kept becomes small as the process goes on. Therefore, it is more preferable for saving the memory area.

In addition, the thinning-out threshold value MH can be determined promptly by the trial calculation of the data quantity of the compressed image data AD. The trial calculation of the data quantity can be performed by a simple calculation process. Therefore, when the compression method of the present embodiment is used, it can be processed faster than the conventional method.

In addition, since a sufficient compression ratio is obtained even at the time point of the thinning-out process in the present embodiment, it is possible to omit the coding process and still to control data quantity after the compression less than the target data quantity GL. In this way, it is possible to omit the coding process and to adopt two-stage compression including the modeling process and the thinning-out process, so that the process efficiency can be further improved.

In the present embodiment, the processes are performed for each divided region TL with respect to the image data FD or the pseudo gradation image data D1. It is possible to perform the processes for each band that is a group of divided regions TL on one row. In this way, since the processes are performed for each divided region TL or each band, the printer 13 can perform a band process that is a process for printing by the band.

In the present embodiment, the trial calculation of data quantity of the compressed image data AD is performed by using first the thinning-out threshold value MH in the case where data is thinned out to the least extent by the thinning-out process. Then, a value of the thinning-out threshold value MH is increased step by step, so as to determine a thinning-out threshold value MH such that data quantity obtained by the trial calculation becomes less than the target data quantity GL. It is possible to use first a thinning-out threshold value MH that permits deterioration in image quality to some extent and to increase the thinning-out threshold value MH step by step. In this case, it is possible to find earlier the thinning-out threshold value MH such that data quantity of the compressed image data AD becomes less than the target data quantity GL, so that the process time can be shortened. This structure is effective particularly in the case where the target data quantity GL is set to a low value.

In the thinning-out process of the present embodiment, data quantity is reduced by separating necessary information from unnecessary information based on the thinning-out threshold value MH. Therefore, such a process can be called a "selecting process." The thinning-out threshold value MH that is used for such a process can be called a "selecting reference." Note that "error quantity when the representative value is used" can be used as a reference for selecting in the first example, "quantity of a high frequency component" can be used in the second example, and "density variation in the block" can be used in the third example.

In addition, in the thinning-out threshold value deciding process, the thinning-out threshold value MH is decided so that it is decided to what extent deterioration of image quality after the compression is permitted, i.e., with what extent of accuracy the image data is reproduced. Therefore, this type of process can be called an "accuracy deciding process."

In the present embodiment, when each data such as modeled data MD is generated, the original data is deleted from the memory area after the generation. However, it is possible not to delete the original data if memory capacity is large enough to secure sufficient free space in the memory area.

In the present embodiment described above, the thinning-out threshold value MH is determined by trial calculation of data quantity of the compressed image data AD. It is possible to determine the same by trial calculation of data quantity of the thinned-out data ED.

In the present embodiment, for the purpose of simple description, the compression process is divided into the modeling process, the thinning-out process and the coding process, which are described step by step. It is possible to modify or integrate contents of each process in accordance with the spirit of the present invention, if necessary.

For example, although the quantization is performed in the modeling process in the second example, it is possible to perform the quantization in the thinning-out process. In this case, division by the quantization value and the division by the thinning-out threshold value MH are performed at the same time. More specifically, DCT coefficients are determined by the discrete cosine transformation based on density values of pixels in the modeling process, and the thinned-out coefficients are determined by using the thinning-out threshold value and the quantization value from the DCT coefficient so that the thinned-out data can be generated in the thinning-out process.

In addition, in the case where the coding process is performed in the thinning-out process, it is possible to perform the coding process when the data thinning-out process is completed with respect to every divided region TL, or to perform the data thinning-out process and the coding process with respect to each divided region TL.

In addition, various data including the modeled data MD and the like in the present embodiment may indicate data generated with respect to the entire image data FD in some cases and indicate data of an individual part corresponding to the divided region TL in other cases.

In addition, it is possible to perform the compression process of the present embodiment in the printer 13. In this case, in a type having a copy function for example, the compression method of the present embodiment can be applied to data of an original that is read in copying.

Other than that, the structure, the functions, the numbers of the entire or each part of the computer main body 11, the printer 13 and the print system 1, the number of bits, the trial calculation method of data quantity, the quantization table RT, the contents indicated by each data, the process contents, the process order and the like can be modified in accordance with the spirit of the present invention, if necessary.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image data compression method for generating compressed data of image data, comprising the steps of:
    dividing the image data into predetermined regions;
    generating modeled data by extracting a feature of the image data for each of the regions, the modeled data being data whose image reproducibility varies when a part of the modeled data is thinned out step by step;
    determining a thinning-out threshold value, the thinning-out threshold value being used when the compressed data is generated by thinning out data from the modeled data, and the thinning-out threshold value having a value such that data quantity of the compressed data becomes equal to or less than predetermined target data quantity; and
    generating the compressed data by thinning out data from the modeled data based on the determined thinning-out threshold value,
    wherein the image data is pseudo gradation image data that is obtained by a pseudo gradation process performed on multi gradation image data with a dither pattern, and
    wherein the step of generating the modeled data includes the following steps:
        generating a representative value of the image data of each of the regions;
        generating an indicator that indicates whether or not a pseudo gradation image dot pattern that is a dot pattern indicated by the pseudo gradation image data can be reproduced correctly when a dot pattern of the region is reproduced based on the representative value, and
        comparing a reproduced dot pattern with the pseudo gradation image dot pattern of the region, with said reproduced dot pattern being produced based on a representative value of the region and the dither pattern;
        if the reproduced dot pattern is equal to the pseudo gradation image dot pattern, the representative value is included in the modeled data; and
        if the reproduced dot pattern is not equal to the pseudo gradation image dot pattern, the following data will be generated and included in the modeled data:
            (1) data that indicates a mismatching degree between the reproduced dot pattern and the pseudo gradation image dot pattern;
            (2) the representative value of the region; and
            (3) the pseudo gradation image dot pattern.

2. The image data compression method according to claim 1, wherein the step of generating compressed data includes:
    in the case where the reproduced dot pattern is not equal to the pseudo gradation image dot pattern,
    comparing the thinning-out threshold value and the mismatching degree between the reproduced dot pattern and the pseudo gradation image dot pattern, and
    based on the result of the comparison, deciding which one of the representative value of the region and the pseudo gradation image dot pattern is to be used as compressed data.

3. The image data compression method according to claim 1, wherein, as the representative value of each of the regions, the number of blackened dots of the pseudo gradation image dot pattern of the region is used.

4. The image data compression method according to claim 1, wherein the representative value of the region is decided based on a density value of a dotted pixel and a density value of an undotted pixel when a dot pattern is reproduced by comparing a density value of each pixel of the region with a density value of each pixel of the dither pattern corresponding to the region.

5. The image data compression method according to claim 4, wherein, as the representative value of the region, a value such that a difference with a representative value of a region that neighbors the region becomes minimum is used.

6. The image data compression method according to claim 1, wherein the density value of each pixel in the region is determined by interpolation using representative values of one or more neighboring regions.

7. The image data compression method according to claim 1, further comprising a step of deleting the image data when the modeled data is generated.

8. The image data compression method according to claim 1, further comprising a step of deleting the modeled data when the compressed data is generated.

9. The image data compression method according to claim 1, wherein the step of generating compressed data includes a step of coding data after thinning out data from the modeled data.

10. An image data compression device for generating compressed data of image data, comprising:
   a modeling section that divides the image data into predetermined regions and generates modeled data by extracting a feature of the image data for each of the regions, the modeled data being data whose image reproducibility varies when a part of the modeled data is thinned out step by step;
   a threshold value deciding section that determines a thinning-out threshold value, the thinning-out threshold value being used when the compressed data is generated by thinning out data from the modeled data, and the thinning-out threshold value having a value such that data quantity of the compressed data becomes equal to or less than predetermined target data quantity; and
   a compressing section that generates the compressed data by thinning out data from the modeled data based on the determined thinning-out threshold value,
   wherein the image data is pseudo gradation image data that is obtained by a pseudo gradation process performed on multi gradation image data with a dither pattern,
   wherein the modeling section generates the following:
   a representative value of the image data of each of the regions;
   an indicator that indicates whether or not a pseudo gradation image dot pattern that is a dot pattern indicated by the pseudo gradation image data can be reproduced correctly when a dot pattern of the region is reproduced based on the representative value; and
   modeling data by the following procedure:
      comparing a reproduced dot pattern with the pseudo gradation image dot pattern of the region, with said reproduced dot pattern being produced based on a representative value of the region and the dither pattern;
      if the reproduced dot pattern is equal to the pseudo gradation image dot pattern, the representative value is included in the modeled data; and
      if the reproduced dot pattern is not equal to the pseudo gradation image dot pattern, the following data will be generated and included in the modeled data:
         (1) data that indicates a mismatching degree between the reproduced dot pattern and the pseudo gradation image dot pattern;
         (2) the representative value of the region; and
         (3) the pseudo gradation image dot pattern.

11. A printer system comprising:
the image data compression device according to claim 10; and
a printer that prints an image by receiving the compressed data supplied from the image data compression device and by reproducing image data from the compressed data.

12. A non-transitory computer readable recording medium that stores a computer program for making a computer perform a process of generating compressed data of image data, the computer program making the computer perform the process comprising the steps of:
   dividing the image data into predetermined regions;
   generating modeled data by extracting a feature of the image data for each of the regions, the modeled data being data whose image reproducibility varies when a part of the modeled data is thinned out step by step;
   determining a thinning-out threshold value, the thinning-out threshold value being used when the compressed data is generated by thinning out data from the modeled data, and the thinning-out threshold value having a value such that data quantity of the compressed data becomes equal to or less than predetermined target data quantity; and
   generating the compressed data by thinning out data from the modeled data based on the determined thinning-out threshold value,
   wherein the image data is pseudo gradation image data that is obtained by a pseudo gradation process performed on multi gradation image data with a dither pattern, and
   wherein the step of generating the modeled data includes the following steps:
      generating a representative value of the image data of each of the regions;
      generating an indicator that indicates whether or not a pseudo gradation image dot pattern that is a dot pattern indicated by the pseudo gradation image data can be reproduced correctly when a dot pattern of the region is reproduced based on the representative value; and
      comparing a reproduced dot pattern with the pseudo gradation image dot pattern of the region, with said reproduced dot pattern being produced based on a representative value of the region and the dither pattern;
      if the reproduced dot pattern is equal to the pseudo gradation image dot pattern, the representative value is included in the modeled data; and
      if the reproduced dot pattern is not equal to the pseudo gradation image dot pattern, the following data will be generated and included in the modeled data:
         (1) data that indicates a mismatching degree between the reproduced dot pattern and the pseudo gradation image dot pattern;
         (2) the representative value of the region; and
         (3) the pseudo gradation image dot pattern.

* * * * *